United States Patent [19]
Maeda et al.

[11] Patent Number: 5,926,546
[45] Date of Patent: Jul. 20, 1999

[54] COMMUNICATION DEVICE AND SYSTEM FOR MOBILE ENCRYPTED COMMUNICATION

[75] Inventors: Asako Maeda, Tokai; Toshihide Ando, Chita-gun; Ichiro Yoshida, Takahama, all of Japan

[73] Assignee: Denso Corporation, Kariya

[21] Appl. No.: 08/733,912

[22] Filed: Oct. 18, 1996

[30] Foreign Application Priority Data

Oct. 19, 1995 [JP] Japan ................................ 7-271219

[51] Int. Cl.⁶ ........................................................ H04L 9/00
[52] U.S. Cl. .................................................. 380/9; 380/24
[58] Field of Search ........................ 380/6, 9, 23, 24, 380/25, 49; 340/825.34, 928

[56] References Cited

U.S. PATENT DOCUMENTS

| | | | |
|---|---|---|---|
| 4,305,152 | 12/1981 | Asakawa et al. | 380/6 |
| 4,882,779 | 11/1989 | Rahtgen | 380/25 |
| 5,310,999 | 5/1994 | Claus et al. | 380/23 |
| 5,485,520 | 1/1996 | Chaum et al. | 380/24 |
| 5,502,767 | 3/1996 | Sasuta et al. | 380/49 |
| 5,581,249 | 12/1996 | Yoshida | 340/928 |
| 5,600,723 | 2/1997 | Woodall et al. | 380/23 |
| 5,602,919 | 2/1997 | Hurta et al. | 380/24 |
| 5,640,156 | 6/1997 | Eguchi et al. | 340/928 |
| 5,705,996 | 1/1998 | Eguchi et al. | 340/928 |
| 5,708,972 | 1/1998 | Matsumoto | 340/825.34 |

FOREIGN PATENT DOCUMENTS 4-315282  11/1992  Japan .

OTHER PUBLICATIONS

Applied Cryptography, Second Edition, Bruce Schneier, John Wiley & Sons, Inc. (pp. 308–311).

Safer K–64: A Byte–Oriented Block–Ciphering Algorithm, James L Massey (Cambridge Algorithms Workshop Dec. 9–11, 1993, vol. 809, pp. 1–17, Published in Dec. 1994).

*Primary Examiner*—Salvatore Cangialosi
*Attorney, Agent, or Firm*—Pillsbury Madison & Sutro LLP

[57] ABSTRACT

An automatic collection system for automatically collecting a toll charge from an IC card is provided with transceivers in gantries installed along a vehicle road. This collection system uses the transceivers to perform communication with a vehicle-mounted device based on the use of encrypted data. The vehicle-mounted device performs the encryption and decryption of the communication data before its entry into the communication area of the gantries and after its passage therethrough. Also, writing of the data into the IC card, etc. are also performed using encrypted data. However, an algorithm which differs from that used in encrypting the data stored in the IC card and which enables the execution of the high speed processing is used for encrypting the communication data. As a result, since the encryption and decryption of the data is performed only in the roadside device side during communication and this encryption and decryption can be performed at a high speed, the communication time can be shortened to perform accurate data communications within a limited period of time while the vehicle is travelling.

18 Claims, 11 Drawing Sheets

COMMUNICATION DEVICE AND SYSTEM FOR MOBILE ENCRYPTED COMMUNICATION

CROSS-REFERENCE TO RELATED APPLICATION

This application is related to and claims priority from Japanese Patent Application No. Hei-7-271219, the contents of which are hereby incorporated by reference.

BACKGROUND OF THE INVENTION

1. Field of the invention

The present invention relates to a vehicle-mounted communication device which performs data communication using encrypted data with a roadside device disposed along a vehicular road. The present invention also relates to a cruising vehicle monitoring system which includes this vehicle-mounted device and the roadside device for monitoring vehicles that travel in the vicinity of the roadside device. In particular, the present invention relates to a device for performing automatic collection of a toll charge from a vehicle that travels along a toll road.

2. Description of Related Art

A toll charging system for automatically collecting a toll charge from a vehicle travelling along a toll road is well-known. This toll charging system includes a communication device (i.e., a roadside device) that is installed at an entrance or exit of the toll road and a communication device (i.e., a vehicle-mounted device) that is installed in a vehicle that travels along the toll road. This vehicle-mounted device transmits vehicle passenger data and method of payment data in response to an inquiry from the roadside device. This toll charging system performs automatic toll charge collection in the roadside device based on the transmission data from the vehicle-mounted device.

Meanwhile, in the above-mentioned system, because private information such as toll charge data, vehicle data, passenger data and the like are transmitted via radio communication between the vehicle-mounted device and the roadside device, there is a possibility that such data will be intercepted and wrongly used by a third party. For example, when a cash card is used for paying the toll charge, there is a possibility that cash card information will be intercepted and wrongly used.

Accordingly, in order to solve the above-mentioned problems, for example, one well-known proposal as disclosed in U.S. Pat. No. 5,310,999 proposes the execution of data communication between the vehicle-mounted device and the roadside device using encrypted data, which is obtained by encrypting the data to be transmitted, so that the contents of the data will be incomprehensible to the third party that intercepts such data.

Meanwhile, in the above-proposed system, because a known standardized encryption protocol such as the Data Encryption Standard (DES) algorithm for performing the reading and writing of data with respect to an IC card or the like is used for encrypting the communication data, the communication data between the vehicle-mounted device may be under certain circumstances decrypted relatively easily after such data is intercepted and analyzed. In this way, there may be problems regarding the confidentiality of data. Also, because it takes the DES algorithm a significant amount of time to perform the data encryption operation and because it is difficult to speed up this DES algorithm, the following problem occurs when the vehicle is moving fast and the DES algorithm is taking a significant amount of time in encrypting the transmission data and decrypting the reception data during communication operations between the vehicle-mounted device and the roadside device. That is, the vehicle-mounted device might leave a communication area of the roadside device before data communication operations are finished after the vehicle-mounted device enters the communication area of the roadside device.

For example, in the above-described toll charging system, when the vehicle-mounted device writes data (e.g., toll collection data) into a cash card or the like, and, after completion thereof, encrypts this data and transmits the encrypted data to the roadside device, the vehicle-mounted device first decrypts the data transmitted from the roadside device in order to perform the toll collection, then writes the data into the cash card or the like based on such decrypted data, encrypts the resulting data and transmits the encrypted result to the roadside device. However, it takes the foregoing system a significant amount of time to perform decryption of the data from the roadside device and encryption of the data to be transmitted to the roadside device. For example, assuming that the amount of time needed for the respective encryption and decryption operations is 30 ms and the cruising speed of the vehicle is 120 km/h, the vehicle travels one meter each time the vehicle-mounted device performs one encryption or decryption operation. On the other hand, since the communication area of the roadside device is set usually to a size that corresponds approximately to the size of the vehicle to prevent a plurality of vehicles from simultaneously entering into it, the travel distance of the vehicle within the communication area will be a few meters or so. Accordingly, in a highway where vehicles travel at speeds of approximately 120 km/h, because the encryption and the decryption operations need to be executed in both the vehicle-mounted device and the roadside device even during one-way communication to perform normal data communication between them, data communication (two-way communication) between the roadside device and the vehicle-mounted device can be performed once or twice at the most. If there are more communication operations, the vehicle-mounted device will go out of the communication area before communication operations are completed and thus, normal data communication becomes impossible.

On the other hand, in order to solve the above-mentioned problem, one may impose vehicle speed limits or replace an encryption device that performs the encryption operation in accordance with the DES algorithm with a device that enables high speed encryption processing. However, limiting the travel speed of the vehicle leads to traffic congestion and thus, negates the purpose of automatically collecting toll charges via radio communication, which is to lessen traffic congestion. Conversely, in order to make the processing speed of the encryption device faster, there is a need to use expensive encryption devices. Therefore, even if such expensive devices can be used for the roadside device, installation of such expensive encryption device in the vehicle-mounted device will be difficult to implement because this means increased burden on the toll road users.

Also, another option for increasing encryption speed is to use an encryption algorithm different from the DES algorithm, for example, an encryption algorithm that enables encryption to be performed through pipeline processing implemented using hardware. However, in this case, when the encryption device is constructed to perform encryption not through software processing using a CPU but via pipeline processing using special purpose hardware, the encryption device itself becomes expensive, and thus, even if it is possible to employ this construction for the roadside device, providing the same encryption device in the vehicle-mounted device will be difficult.

SUMMARY OF THE INVENTION

In view of the foregoing problems in the prior art, it is a goal of the present invention to provide a vehicle-mounted communication device which can efficiently encrypt data to be transmitted, perform communication in a small communication area for a short period of time and prevent illegal interception of the communication data and the like. The present invention also aims to provide a vehicle monitoring system such as the above-mentioned toll charging system that uses this vehicle-mounted communication device.

To achieve the foregoing objects, one aspect of the present invention provides a vehicle-mounted communication device which is installed in a vehicle and which is for performing communication operations with a roadside device installed along a toll road when the vehicle is within a communication area of the roadside device. The vehicle-mounted communication device includes a cryptographic unit and a communication unit. The cryptographic unit encrypts transmission data to be transmitted to the roadside device before the vehicle enters the communication area of the roadside device. The communication unit performs communication operations with the roadside device by transmitting transmission data encrypted by the cryptographic unit and by receiving reception data from the roadside device. Preferably, the cryptographic unit decrypts the reception data after the communication unit completes communication operations with the roadside device.

In this way, since it takes a significant amount of time to encrypt the transmission data and decrypt the reception data, the vehicle-mounted communication device according to the present invention performs this data encrypting and decrypting operations when it is not performing communication operations with the roadside device. In other words, there will be less burden on the vehicle-mounted communication device when it is performing communication operations with the roadside device. Thus, duration of communication between the vehicle-mounted device and the roadside device can be shortened and accurate data communication between them can be performed without imposing speed limits on the vehicle or using an expensive cryptographic device for executing the encrypting and decrypting operations.

Preferably, the vehicle-mounted communication device further includes a drive unit for receiving an IC card that stores predetermined card data, and the cryptographic unit includes an encryptor and a decryptor. The encryptor reads card data of the IC card, encrypts the card data to generate the transmission data and stores the transmission data. The decryptor decrypts the reception data received by the communication unit to obtain decrypted data and stores in the IC card a result of the communication operation of the communication unit based on the decrypted data. The decryptor decrypts the reception data after the communication unit completes the communication operations with the roadside device.

In this way, when the vehicle enters the communication area of the roadside device, the communication unit starts to perform data communication with the roadside device by transmitting data encrypted by the encryptor. Then, when the communication unit finishes the data communication operation with the roadside device, the decryptor decrypts the reception data. Thus, the vehicle-mounted communication device is not burdened with decrypting the reception data when it is communicating with the roadside device and so, communication time between the vehicle-mounted device and the roadside device can be shortened. Meanwhile, the IC card is used for storing at least part of data to be transmitted to the roadside device such as identification code of the driver of the vehicle, bank account number and the like.

Incidentally, in a toll charging system, there might be a need to write the communication result into the IC card and inform the result of such to the roadside device. Thus, it helps if this result is encrypted beforehand as the transmission data after the completion of the communication between the vehicle-mounted device and the roadside device. Thereafter, the encrypted data is transmitted to the roadside device when the vehicle enters the next communication area of the roadside device.

Preferably, the decryptor encrypts the result of the communication operation before storing the result in the IC card and the decryptor uses a card data encryption algorithm for encrypting the result. It must be noted here that the card data encryption algorithm is different from a communication encryption algorithm used by the decryptor for decrypting the reception data and by the encryptor for encrypting the card data to generate the transmission data.

That is, when writing data into the IC card, such data is usually encrypted using the DES algorithm or the like to prevent interception of the contents of the data. However, using the same algorithm for decrypting the reception and encrypting the transmission data may pose problems on data security and thus, it will be best to use different algorithms for these encrypting operations. In this way, data can be safely and securely communicated between the roadside device and the vehicle-mounted device.

Preferably, the vehicle-mounted communication device is provided with a verification unit for driving the encryptor and the IC card to perform a mutual verification operation using predetermined verification data when the IC card is inserted inside the drive unit and before the encryptor generates the transmission data. Here, the verification unit also drives the encryptor to include a result of the mutual verification operation in the transmission data.

In the above-mentioned toll charging system or the like, there is a possibility that not only the IC card but also the vehicle-mounted communication device itself will be forged. As a countermeasure against this, the verification unit is provided for executing a mutual verification procedure between the encryptor and the IC card. After performing this verification procedure, the verification results are included in the transmission data to be sent to the roadside device. In this way, the roadside device will be notified of possible trouble in the vehicle-mounted device.

Preferably, the communication encryption algorithm has a higher processing speed than the card data encryption algorithm. In this way, the communication time between the vehicle-mounted device and the roadside device can be shortened. Accordingly, data communication can be executed more reliably even if the vehicle is passing through the communication area of the roadside device at a high speed.

Preferably, the vehicle-mounted device has an error determination unit for determining an error in operations of the cryptographic unit, and the communication unit, and for adding an error data indicative of the determined error to the transmission data. In this way, the roadside device can be informed of any error in the vehicle-mounted device so that it can take measures such as sending a message to the driver to stop the vehicle, taking a photograph of the vehicle or the like.

Another aspect of the present invention provides a vehicle monitoring system which monitors a vehicle that cruises along a toll road and which includes a vehicle-mounted device and a roadside device. The roadside device is installed along the toll road to emit signals towards a predetermined communication area. This roadside device performs a communication operation with the vehicle-mounted device when the vehicle is within the communication area. The vehicle-mounted device and the roadside device perform communication operations using communication data that includes an encrypted part and an unencrypted part.

In this way, with the communication data containing an encrypted part and an unencrypted part, it becomes more difficult to decipher the communication data even if such data is intercepted and thus, highly reliable communication operations can be performed between the vehicle-mounted device and the roadside device.

One other aspect of the present invention provides a vehicle monitoring system which includes a vehicle-mounted device and a roadside device. The roadside device emits a pilot signal for every predetermined time interval to the communication area, terminating emission of the pilot signal after the vehicle enters the communication area, performs a communication operation with the vehicle-mounted device by sending and receiving communication data to and from the vehicle-mounted device while the vehicle is within the communication area, transmits a transmission completion signal to the vehicle-mounted device to indicate completion of the communication operation and again emits the pilot signal after completing the communication operation with the vehicle-mounted device. The vehicle-mounted device provides a pilot response signal to the roadside device after receiving the pilot signal from the roadside device and subsequently starts the communication operation with the roadside device. This vehicle-mounted device receives the transmission completion signal from the roadside device after completing the communication operation with the roadside device. The roadside device terminates the emission of the pilot signal after receiving the pilot response signal from the vehicle-mounted device, and resumes the emission of the pilot signal at predetermined time intervals after sending the transmission completion signal.

In this way, while there may be a plurality of vehicles running along the toll road, the roadside device can swiftly start communication operations with a vehicle-mounted communication device of a next vehicle after finishing communication operations with the present vehicle. In this way, the roadside device can perform accurate communication operations even if vehicles enter its communication area in succession.

Preferably, the roadside device sends an unmodulated carrier wave for a predetermined time period to the vehicle-mounted device after sending one of the pilot signal and the communication data to the vehicle-mounted device; the vehicle-mounted device generates the communication data by modulating the carrier wave signal based on predetermined transmission information and provides the communication data to the roadside device; and the vehicle-mounted device sends a completion request signal to the roadside device after completing the communication operation with the roadside device unless the roadside device sends the transmission completion signal.

In this way, with the communication operation using the completion request signal and the transmission completion signal, the vehicle-mounted device and the roadside device can check if the communication operation between them was completed properly or not.

Preferably, the roadside device is installed in one of an entrance and an exit of the toll road. The roadside device decrypts the communication data indicative of toll payment information from the vehicle-mounted device during communication operation with the vehicle-mounted device. The roadside device performs a toll charge operation to collect toll charge from the vehicle-mounted device based on the toll payment information, encrypts a result of the toll charge operation and sends the encrypted result to the vehicle-mounted device. The vehicle-mounted device sends the encrypted data indicative of the toll payment information during communication with the roadside device. In addition, the vehicle-mounted device receives the encrypted result of the toll charge operation from the roadside device, and decrypts and stores the result. It must be noted here that the vehicle-mounted device and the roadside device transmit the communication data using a common format. In this way, because the vehicle-mounted device and the roadside device use the same data format, encoding and decoding operations in these devices can be performed efficiently.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY-PREFERRED EXEMPLARY EMBODIMENT

A preferred embodiment of the present invention is described hereinafter with reference to the accompanying drawings.

Figure 1:
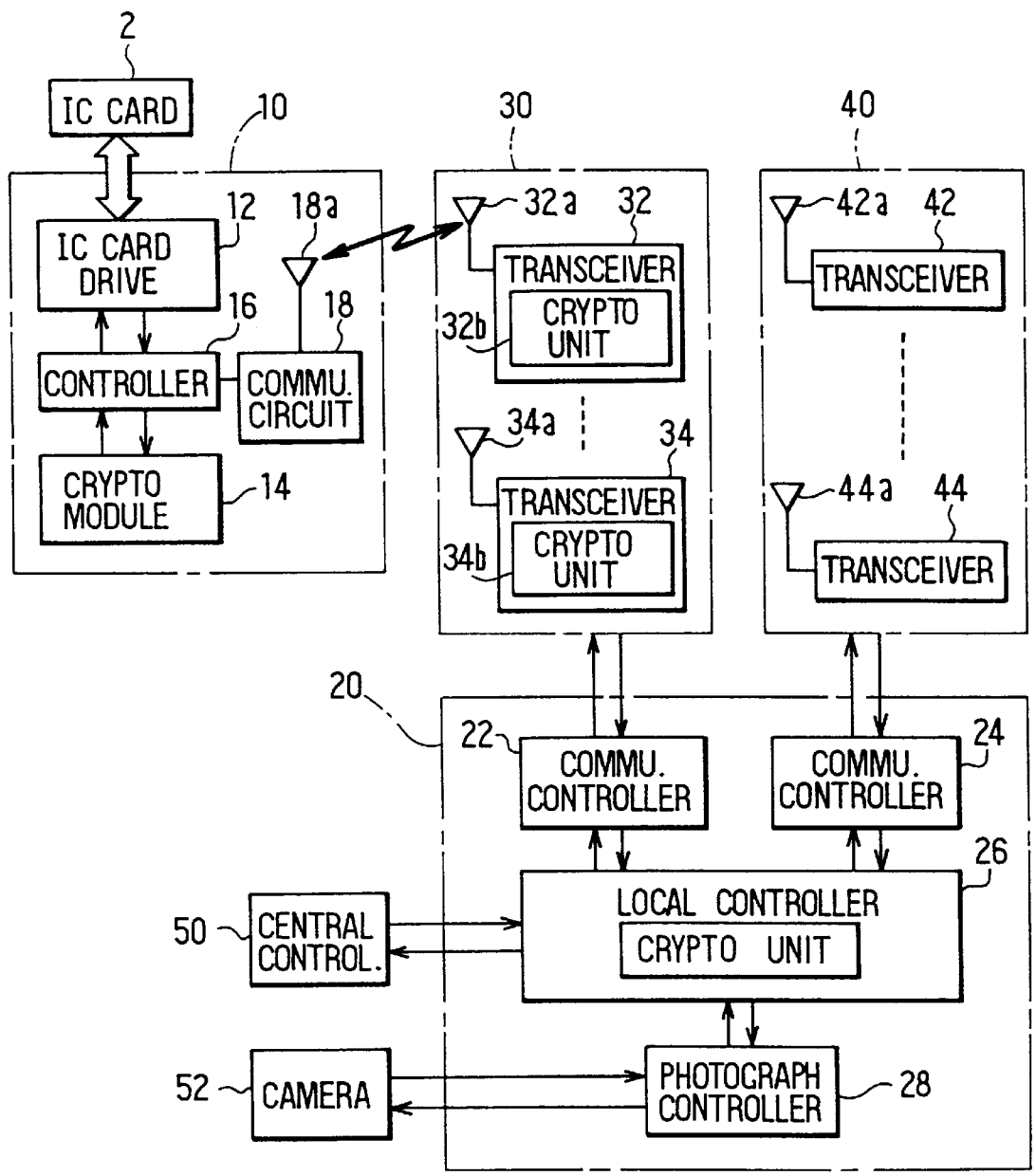
FIG. 1 is a block diagram of a toll road toll charging system according to a preferred embodiment of the present invention.

First, FIG. 1 is a block diagram illustrating the construction of an overall toll road toll charging system according to the present embodiment.

As illustrated in FIG. 1, the toll road toll charging system according to the present embodiment includes a vehicle-mounted device 10 that is installed in a vehicle and a roadside device 20 that is installed in the vicinity of an entrance or exit of a toll road. The roadside device 20 is connected to first and second gantries 30, 40 that are placed at predetermined intervals along the toll road in the forward direction of the vehicles. These gantries 30, 40 are two elevated platforms which traverse the toll road which has a plurality of vehicular lanes. The first gantry 30 and the second gantry 40 are equipped with transceivers 32, 34, . . . and 42, 44, . . . , respectively, for performing data communication with each vehicle-mounted device 10 that has been installed in each vehicle that is travelling along each lane of the road.

When the vehicle passes through gantries 30, 40, the vehicle-mounted device 10 automatically performs data communication with the communication device (i.e., a transceiver) of the communication area the vehicle is passing through. The vehicle-mounted device 10 includes an IC card drive 12, a communication circuit 18 which has an antenna 18a and which performs radio communication with the transceivers 32, 34, . . . , 42, 44, . . . , a cryptographic module (hereinafter referred to as "crypto module") 14 for encrypting transmission data, and for decrypting reception data and a controller 16 which includes a microprocessor for controlling the foregoing circuits. The IC card drive 12 may be loaded with a detachable IC card 2 which may be a cash card or prepaid card for payment of a toll charge. This IC card drive 12 performs data read and write operations on the IC card 2.

It should be noted that the crypto module 14 may be built inside or attached to the vehicle-mounted device 10 and is for changing the encryption algorithm or the key data used for encryption. In other words, the crypto module 14 may be detached from the vehicle-mounted device 10 to reprogram its encryption software or may remain inside the vehicle-mounted device 10 while changing its encryption algorithm and key data. In this way, it is possible to change the encryption algorithm and the key data of the crypto module 14.

The transceivers 32, 34, . . . that are installed inside the first gantry 30 not only include antennas 32a, 34a, for performing radio communication with the vehicle-mounted device 10 but also cryptographic units (hereinafter referred to as "crypto units") 32b, 34b, . . . for encrypting transmission data and decrypting reception data. These transceivers 32, 34 perform data communication with the vehicle-mounted device 10 while also encrypting and decrypting data. In contrast, the transceivers 42, 44, . . . that are installed inside the second gantry 40 have no such crypto units and perform only data communication with the vehicle-mounted device 10 via their antennas 42, 44, . . . That is, the transceivers 42, 44, . . . provide and receive transmission data and reception data respectively to and from the roadside device 20 as is. Although not shown in FIG. 1, it must be noted that in the same way as the vehicle-mounted device 10, each of the transceivers 32, 34, . . . and 42, 44, . . . is equipped with a communication circuit for performing trans-ceiving operations and a control device which includes a microprocessor and whose control processes supervise radio communication with the vehicle-mounted device 10 and data transmission with the roadside device 20.

The roadside device 20 is provided with a pair of gantries 30, 40. The roadside device 20 also includes communication controllers 22, 24 for controlling the communication operations of the transceivers 32, 34, . . . , 42, 44, . . . and a local controller 26 which includes a microprocessor and which performs data communication with the transceivers 32, 34, . . . and 42, 44, . . . of the gantries 30, 40 via the communication controllers 22, 24 to control the collection of toll charges from a running vehicle.

Also, the roadside device 20 is connected to a plurality of cameras 52 which are installed in the vicinity of the road to take photographs of cruising vehicles. For example, when the system fails to collect a toll charge from a running vehicle, the local controller 26 drives the cameras 52 through a photograph controller 28 to photograph such vehicle. Also, the local controller 26 is connected to a central controller (host computer) 50 which is devoted to managing the toll charge collections of the toll roads. The local controller 26 sends toll charge collection results, information on vehicles from which toll charges were improperly collected and the like to the central controller 50.

In the toll road toll charging system according to the present embodiment, usually, each of the transceivers 32, 34, . . . and 42, 44, . . . of the roadside device 20 transmits a pilot signal for activating the vehicle-mounted devices 10 installed in vehicles travelling along the corresponding vehicle lanes at predetermined time intervals. When the vehicle-mounted device 10 that received this pilot signal has transmitted a response signal and the transceivers 32, 34, . . . 42, 44, . . . have received this response signal, the roadside device 2 executes data communication with the vehicle-mounted unit 10 to collect toll charge.

On the other hand, the vehicle-mounted device 10 is kept in a sleep mode for the purpose of, for example, decreasing its power consumption until it receives the pilot signal from the roadside device 20 and, after receiving the pilot signal, is activated to transmit a response signal and thereafter executes data communication with the transceiver of the roadside device 20 to pay for toll charges.

Also, data communications that are performed between the roadside device 20 and the vehicle-mounted device 10 mentioned above are all executed under the supervision of the roadside device 20. That is, in the present embodiment, for example, as illustrated in FIG. 3, each of the transceivers 32, 34, . . . and 42, 44, . . . of the roadside device 20 is arranged to transmit the pilot signal or a modulated signal for data communication within a predetermined transmission time period T1 and, thereafter during a subsequent predetermined response time period T2, to transmit an unmodulated carrier wave signal. The vehicle-mounted device 10 transmits a response signal to the pilot signal or data signal by modulating the carrier wave signal. Accordingly, the communication circuit 18 of the vehicle-mounted device 10 is constructed, for example, as shown in FIG. 2.

Figure 2:
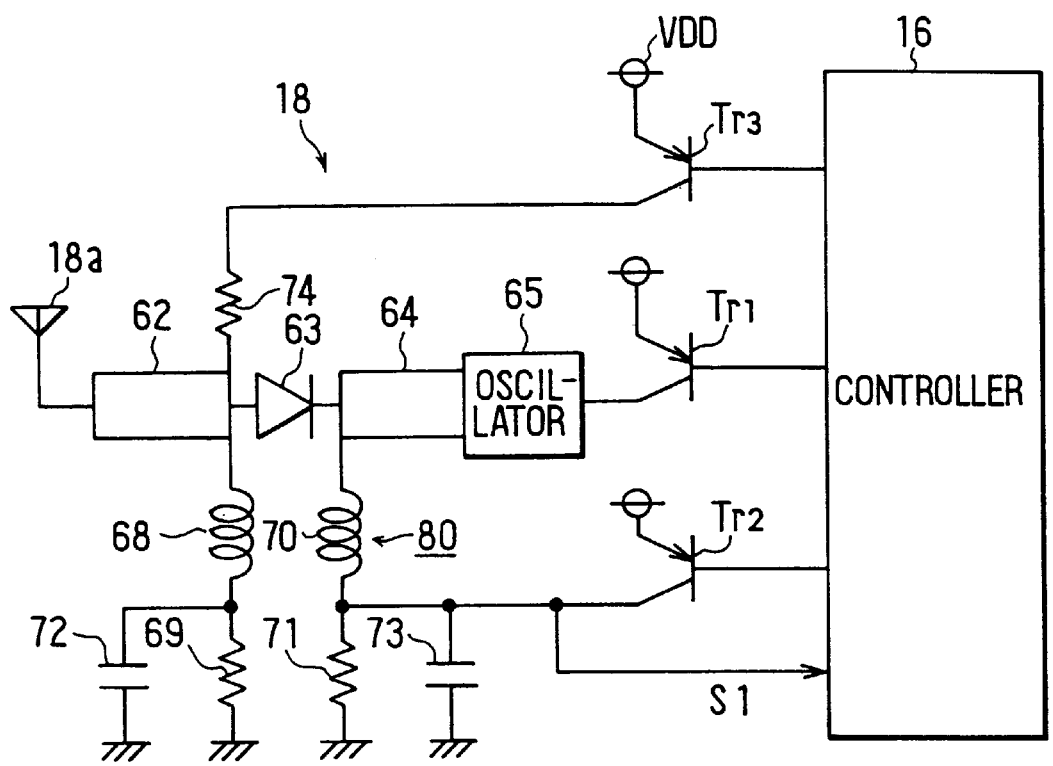
FIG. 2 is a circuit diagram illustrating a communication circuit of a vehicle-mounted device according to the preferred embodiment.
Figure 3:
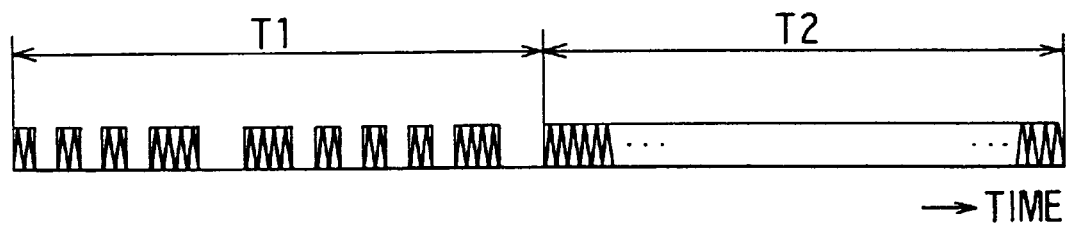
FIG. 3 is a diagram illustrating a format of a transmission signal that is transmitted by a roadside device side communication device according to the preferred embodiment.

That is, as shown in FIG. 2, in the communication circuit 18, the antenna 18a is connected to the anode of a diode 63 via a transmission path 62. The cathode of the same diode 63 is connected to an oscillator 65 via a transmission path 64. The length of this transmission path 64 is set to be $\lambda/4$ wherein $\lambda$ is the wavelength of the carrier wave signal that is transmitted from the roadside device 20. The anode and cathode of the diode 63 are each grounded via a coil 68 and a resistor 69, and via a coil 70 and a resistor 71, respectively.

Also, the coil 68 together with a capacitor 72 that is connected in parallel with the resistor 69 forms a low pass filter while the coil 70 together with a capacitor 73 that is connected in parallel with the resistor 71 forms a low pass filter. Moreover, these low-pass filters together with the diode 63 form an envelope wave detector circuit 80 for detecting the envelope of the reception signal.

Meanwhile, the anode of the diode 63 is connected to a power source VDD via a resistor 74 and a transistor Tr3, the oscillator 65 is connected to the power source VDD via a transistor Tr1, and a point connecting the coil 70 and the resistor 71 is connected to the power source VDD via a transistor Tr2. The bases of these transistors Tr1, Tr2 and Tr3 are connected to the controller 16.

In this way, in the communication circuit 18, when each of the transistors Tr1, Tr2 and Tr3 is deactuated by the controller 16, the transmission signal from the roadside device 20 that has been received by the antenna 18a has its envelope detected by the envelope wave detector circuit 80, and the resulting detected signal Si is provided as the reception signal to the controller 16. That is, in this state, the communication circuit 18 receives a modulated signal that has been transmitted from the roadside device 20 within the transmission time period Ti illustrated in FIG. 3. The communication circuit 18 detects the envelope wave of this reception signal and provides the resulting signal S1 (a binary signal) as reception data to the controller 16.

Next, when the transistors Tr1 and Tr3 are deactuated and only the transistor Tr2 is actuated, since a power source voltage is applied to the cathode of the diode 63, the diode 63 is reverse biased via the resistor 69. Accordingly, in this case, the diode 63 cannot conduct the reception signal and, as a result, the reception signal from the antenna 18a is reflected by the input terminal (anode side) of the diode 63.

On the other hand, when the transistors Tr1 and Tr2 are deactuated and only transistor Tr3 is actuated, since the power source voltage is applied to the anode of the diode 63, the diode 63 is forward biased via the resistors 74, 71. Accordingly, in this case, the diode 63 is brought to a state enabling bi-directional passage of the reception signal. As a result, the reception signal from the antenna 18a passes through the diode 63 and is provided to the transmission path 64 and then is reflected by an input terminal of the oscillator 65 that has an infinitely large input impedance. Further, this reflected wave passes through the diode 63 in the reverse direction and passes through the transmission path 62 and then is radiated from the antenna 18a. And, at this time, since the effective length of the transmission path 64 is λ/4, the signal that is radiated from the antenna 18a has a phase difference of π (180°) with respect to the signal that is reflected when the transistors Tr1 and Tr3 are deactuated and only the transistor Tr2 is actuated.

For this reason, in the communication circuit 18, if the transistors Tr2 and Tr3 are alternately actuated and deactuated within the transmission time period T2 illustrated in FIG. 3 in which the unmodulated carrier wave signal is transmitted from the roadside device 20, the carrier wave signal can be phase modulated (using phase shift keying) and transmitted from the antenna 18a.

That is, in the present embodiment, after the communication circuit 18 receives the transmission signal from the roadside device 20 within the time period T1 illustrated in FIG. 3 and provides the wave detection signal S1 to the controller 16, the controller 16 actuates and deactuates the transistors Tr2 and Tr3 in accordance with data to be transmitted in response to this signal to modulate the phase of the carrier wave signal and transmit the resulting modulated signal from the antenna 18a and thereby perform data communication with the roadside device 20.

It is to be noted that the oscillator 65 and transistor Tr1 are provided to enable data communication with the roadside device of a system that does not transmit unmodulated carrier wave signals. In this case, the controller 16 supplies power to the oscillator 65 by actuating the transistor Tr1 to thereby drive the oscillator 65 to generate the carrier wave signal. Also, in this state, by alternately actuating and deactuating the transistors Tr2 and Tr3 in accordance with the data to be transmitted, switching between transmitting the carrier wave signal from the oscillator 65 via the antenna 18a and blocking the carrier wave signal from the oscillator 65 and preventing this signal from being transmitted from the antenna 18a can be performed. That is, by performing this switching, the signal, which is obtained by performing amplitude shift keying (ASK) on the carrier wave signal from the oscillator 65 in correspondence with the transmission data, will be transmitted from the antenna 18a.

Next, a data communication operation that is executed between the vehicle-mounted device 10 and the roadside device 20 of the toll road toll charging system of the present embodiment and data processing that is executed in the vehicle-mounted device 10 for the execution of this data communication will be explained hereinafter. However, it must be noted here that the following explanation is about communication operations between the roadside device 20 and the vehicle-mounted device 10 that are executed when the toll charge to be paid at the entrance or the exit of the toll road provided with the roadside device 20 is uniform. In this way, these operations may be different from those which are executed when the toll charge is set in accordance with the travelled distance or travelled time.

Figure 4:
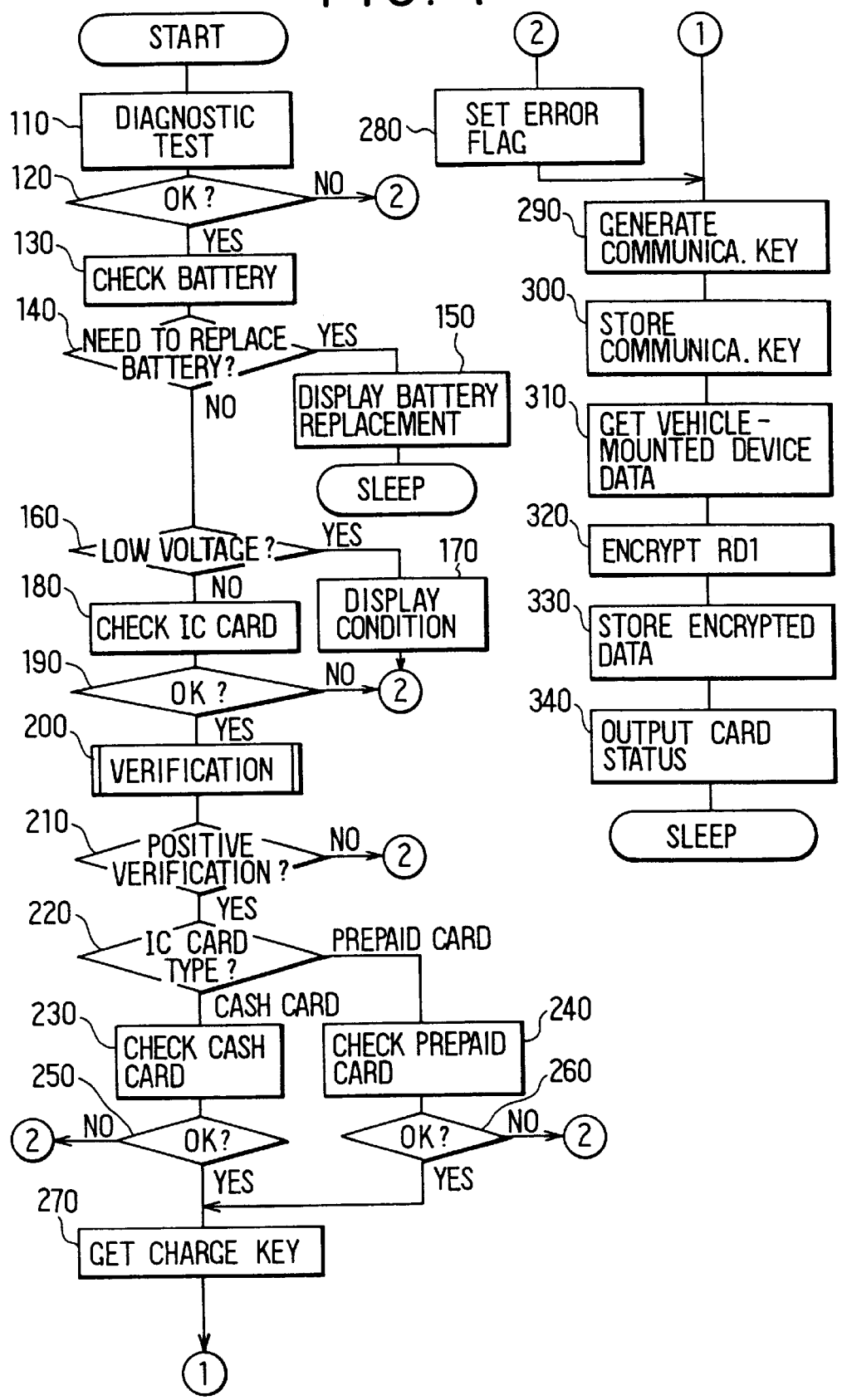
FIG. 4 is a flowchart showing a routine executed by the vehicle-mounted device when an IC card is inserted thereto.

First, in the vehicle-mounted device 10, FIG. 4 is a flowchart showing a data process (card loading process) which is executed by the controller 16 when the IC card 2 is loaded into an insertion opening (not shown) of the IC card drive 12 for preparing the transmission data. It is to be noted that since the vehicle-mounted device 10 is normally kept in a sleep mode as mentioned before, this data process is started when the loading of the IC card 2 has been detected by a sensor provided in the IC card drive 12 and the resulting detection signal has been provided to the controller 16 to activate the same.

As illustrated in FIG. 4, when this process is started, first, step 110 executes a self-diagnostic test for determining whether the controller 16 itself is operating normally or not while step 120 determines whether or not the test result is normal. If the test result indicates an abnormality, then step 120 determines that there is a diagnostic error and so control proceeds to step 280 which is described later. Conversely, if the test result is normal, control goes to step 130 which performs a battery check by determining the voltage of a battery (not shown) that supplies a power source voltage to the vehicle-mounted device 10. It must be noted here that there are two types of batteries which are, namely, a replaceable battery and a sealed battery, and that the battery check here involves checking the voltage of these two batteries.

Next, step 140 determines if the voltage level of the replaceable battery is very low that it needs to be replaced. When step 140 determines that battery replacement is necessary, step 150 sends a replacement message to this effect to a display (not shown) and after which, the controller 16 is set to a sleep mode. After step 140 determines that there is no need to replace the battery, although the battery voltage is sufficient to ensure operations of the controller 16 and the communication circuit 18, step 160 determines whether the battery voltage is insufficient for operating the IC card drive 12, the crypto module 14 and the like (that is, step 160 determines whether the battery voltage is low or not). When the battery voltage level is determined to be low, step 170 displays the battery condition such as a voltage value in the display unit and thereafter, when a battery problem is determined, control goes to step 280 which is described later. When the battery voltage level is normal, control goes to step 180.

With this battery check, it must be noted that after determining that the battery replacement is necessary or that the battery voltage is low, a message is displayed to this effect in the display unit so that the passenger of the vehicle can know the timing for replacing the battery from the contents of the display message and restore the vehicle-mounted device to its normal operating state by replacing the battery.

Next, step 180 actuates the IC card 2 (actuation and resetting) using the IC card drive 12 to read predetermined card data from the IC card 2 and to check if the IC card 2 loaded in the IC card drive 12 can be used in the vehicle-mounted device 10 (IC card check).

Based on the IC card check result, step 190 determines whether or not the IC card 2 can be used in the vehicle-mounted device 10. If the IC card 2 cannot be used, step 190 determines an IC card error and so, control proceeds to step 280 which is described later. If the IC card 2 can be used, control goes to step 200 which activates and drives the crypto module 14 to perform mutual verification with the IC card 2. It is to be noted that this mutual verification process is executed according to the process illustrated in FIG. 5, which is described later, via the use of encrypted data generated in accordance with the above-mentioned DES algorithm.

Next, step 210 determines whether the mutual verification result between the crypto module 14 and the IC card 2 is positive or not. If the mutual verification result is negative, step 210 determines that there is a verification error and so, control goes to step 280 which is described later. If the mutual verification result is positive, control proceeds to step 220.

Step 220 determines whether the IC card 2 is a prepaid card, which indicates the prepayment of the toll charges, or a cash card which permits payment of the toll charges using a predetermined bank account. If the IC card 2 is a cash card, control proceeds to step 230 (cash card check) which retrieves and checks card information, i.e., term of validity of the card, presence/absence of vehicle-mounted device type usage limit, and the like, from the IC card 2. Based on the cash card check result, subsequent step 250 determines if the cash card can be used or not. If the cash card cannot be used, step 250 determines that a cash card error has occurred and so, control goes to step 280 which is described later. Conversely, if the cash card can be used, control proceeds to step 270.

Incidentally, while it has been mentioned that the cash card can store the vehicle-mounted device type usage limit as its card information, this information is for restricting the use of the cash card only for certain vehicle-mounted device types and an identification code is stored in the cash card for this purpose.

On the other hand, if the IC card 2 is a prepaid card, control proceeds to step 240 (prepaid card check) which reads out information in the prepaid card such as its term of validity, the remaining balance, etc., and checks the card information. Based on the card check result, subsequent step 260 determines whether the prepaid card can be used or not. If the prepaid card cannot be used, step 260 determines that a prepaid card error has occurred and so, control proceeds to step 280 which is described later. Conversely, if the prepaid card can be used, control proceeds to step 270.

Step 270 executes a process for retrieving a toll charging key Z used in collecting the toll charge from the IC card 2 and storing the collection results (date/time of use, remaining balance) in the same IC card 2, and thereafter, control then proceeds to a subsequent step 290. That is, the IC card 2 uses encrypted data for updating its data to prevent the stored data from being overwritten easily. Here, at this stage, the controller 16 makes the IC card 2 produce the key Z (toll charging key) needed for producing encrypted data for updating the card data, reads and stores this key Z, and thereafter, control proceeds to step 290. It is to be noted that the toll charging key Z is produced using the DES algorithm by encrypting card information such as number of times processed and the like based on a special IC card key (IC card key) that is assigned beforehand to the IC card 2.

On the other hand, when any one of steps 120, 160, 190, 210, 250 or 260 determines an error in the vehicle-mounted device 10 or the IC card 2, an error status flag that indicates the content of such error is set in step 280 and thereafter control proceeds to step 290.

Next, step 290 makes the crypto module 14 produce a key (communication key X1) which will be used for encrypting data to be transmitted to the roadside device 20 and step 300 stores such communication key X1. It must be noted here that when the crypto module 14 receives the command for generating the communication key X1 from the controller 16, the crypto module 14 first generates a random number R1 and produces the communication key X1 using this random number R1 and a communication master key of an encryption key number Kn that is selected from among several kinds of encryption key numbers. Also, an encryption algorithm (hereinafter referred to as an FX algorithm) that enables high-speed encryption in comparison with the DES algorithm is used here to produce this communication key X1.

Here, an encryption algorithm called SAFER·K-64 (Secure And Fast Encryption Routine of Length 64 bits) by J. L. Massey of Switzerland or FEAL (Fast Data Encipherment Algorithm) by H. Matsumoto of NTT, Japan is suitable for use as the FX algorithm.

After producing the communication key X1 mentioned above, step 310 reads the vehicle-mounted device data (first read data) RD1 that is to be transmitted to the roadside device 21. A subsequent step 320 provides this data RD1 to the crypto module 14 which is made to encrypt this data RD1 using the communication key X1 mentioned above. It is to be noted that the FX algorithm is used also for this encryption processing.

After the first read data RD1 has been encrypted by the crypto module 14, the encrypted first read data <RD1> is stored by step 330 as the transmission data to be transmitted to the roadside device 20. Then, step 340 informs the passengers of the vehicle of the state of the card based on the error status set in step 280, card data from the IC card 2, etc. and thereafter, the controller 16 enters a sleep mode.

It is to be noted here that this operation of reporting the card state is performed simultaneously by displaying messages and the like in the display device and by generating sounds using a buzzer. That is, by informing the passenger of the vehicle of the card type, the remaining balance of the IC card 2, the abnormality of the card, etc. using both visual and audio methods, the vehicle passenger can be made to verify the card he is using for toll charge payment and be made to replace the card if there is some abnormality.

Also, for example, as illustrated in TABLE 1, the first read data RD1 that is stored as the transmission data includes a response code to the transceiver of the roadside device 20, a status code such as an error status data that represents the operational state of the vehicle-mounted device 10, a charge payment mode that represents a toll charge payment method, etc., a vehicle-mounted device code which is assigned uniquely to each vehicle-mounted device, a serial number CSN of the IC card 2, balance data of the IC card 2, an exclusive OR (CSN XOR CAN) of the serial number CSN of the IC card 2 and an application number CAN that represents the type of the IC card 2, a transaction counter CTC that represents the most recent position for storing the processed data in the IC card 2, an index that represents the type of the IC card key used to encrypt the card data on the IC card 2 side according to the DES algorithm (index of the key used), etc. Among these data items, the status code, charge payment mode, vehicle-mounted device code, serial number CSN, and part of the balance data are encrypted while the remaining data items are set and stored as is in an unencrypted state as the transmission data.

this random number R to the IC card 2 along with a command for producing a verification encryption key Y (step 1300).

Upon receiving the verification encryption key Y production command, the IC card 2 retrieves the card data from the memory position that corresponds to the transaction counter CTC and, using a verification key which is among the above-mentioned preset IC card keys, encrypts this card data to produce the verification encryption key Y (step 3200). Moreover, using this verification encryption key Y, the IC card 2 encrypts the random number R (step 3300).

When the random number R has been encrypted in the IC card 2 as mentioned above, the controller 16 reads this encrypted data <R> and the card data that has been used for the production of the verification encryption key Y and provides a verification encryption key Y production command to the crypto module 14 along with these data (step 1400).

Then, the crypto module 14 determines the exclusive OR (CSN XOR CAN) of the serial number CSN and application

TABLE 1

| 1ST GANTRY COMMU. SIGNALS | CONTENTS |
| --- | --- |
| 1ST PILOT SIGNAL (ROADSIDE DEVICE) | PILOT SIGNAL LOCATION NO. |
| 1ST PILOT RESPONSE SIGNAL (VEHICLE-MOUNTED DEVICE) | RESPONSE CODE RANDOM NUMBER R1 ENCRYPTION KEY Kn |
| ROADSIDE VERIFIC. MESSAGE (ROADSIDE DEVICE) | DATA RETRIEVAL COMMAND RANDOM NUMBER R3 ENCRYPTION KEY Kc |
| 1ST READ DATA (VEHICLE-MOUNTED DEVICE) | RESPONSE CODE STATUS CODE* (ERROR CODE) MODE OF PAYMENT* VEHICLE-MOUNTED DEVICE CODE* CSN* BALANCE* (PARTLY ENCRYPTED) CSN XOR CAN CTC INDEX OF KEY IN USE |
| 1ST WRITE DATA (ROADSIDE DEVICE) | WRITE COMMAND VEHICLE-MOUNTED DEVICE CODE † TOLL CHARGE TOTAL † LOCATION NO. (PARTLY ENCRYPT.)† TRANSACTION TYPE DATE TIME |
| END SIGNAL (VEHIC-MTD DEVICE) | RESPONSE CODE |
| END ACK. SIGNAL (ROADSIDE DEV.) | END ACKNOWLEDGE |

NOTE:
*DENOTES DATA ENCRYPTED IN THE VEHICLE-MOUNTED DEVICE
†DENOTES DATA ENCRYPTED IN THE ROADSIDE DEVICE

Figure 5:
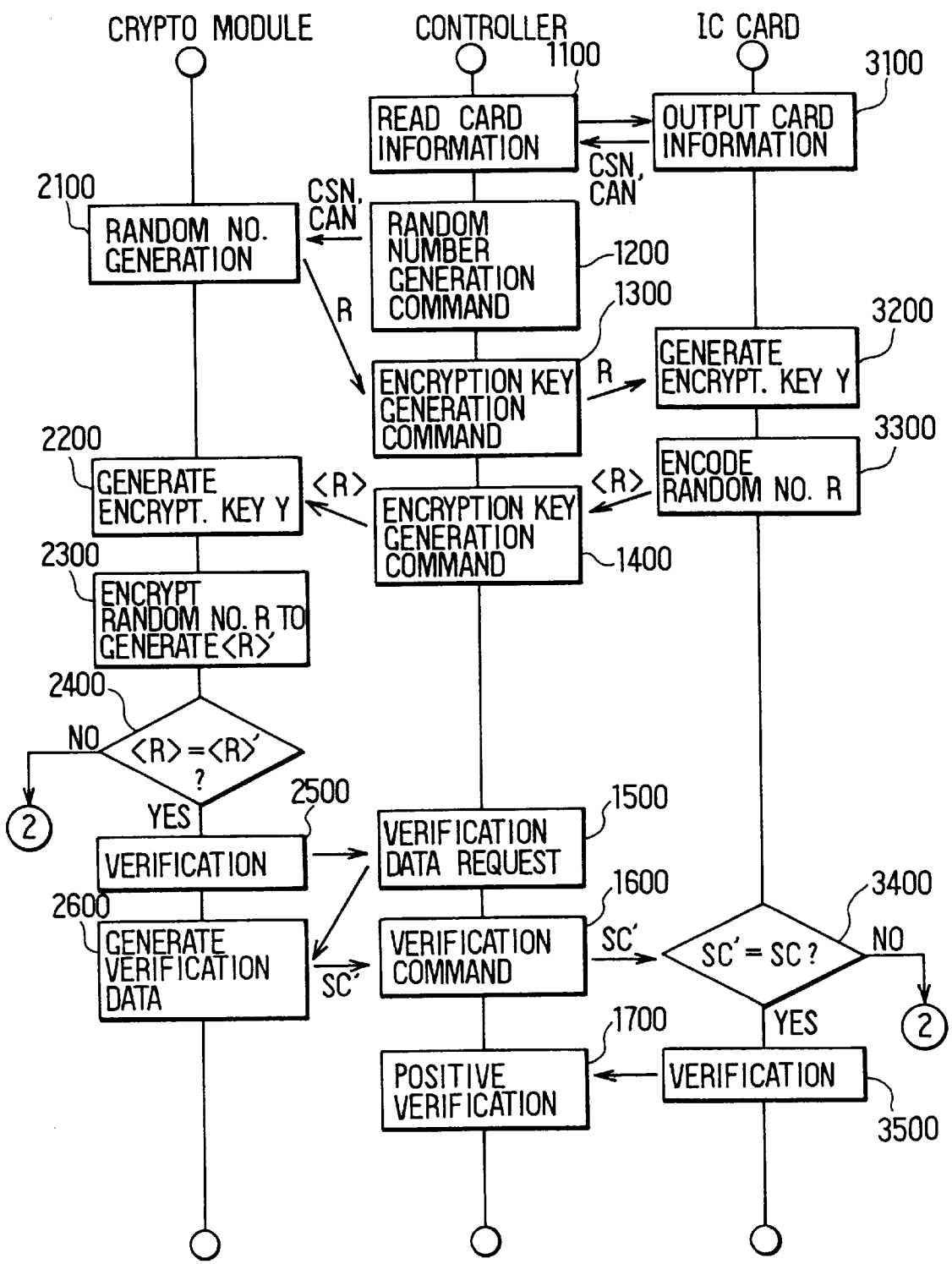
FIG. 5 is a flowchart illustrating a mutual verification process between an IC card and a cryptographic module of the vehicle-mounted device.

Next, the mutual verification process of step 200 between the IC card 2 and the crypto module 14 is executed as illustrated in FIG. 5. It is to be noted that in the operations of the IC card 2 and crypto module 14 that are explained below in connection with FIG. 5, functions that are based on the DES algorithm are used for generating the various data.

That is, as illustrated in FIG. 5, when this mutual verification is performed, first, the controller 16 makes the IC card 2 generate card data including the serial number CSN, application number CAN, etc. (step 3100) and thereafter, the controller 16 retrieves such data (step 1100). The controller 16 transfers the retrieved card data (CSN, CAN) to the crypto module 14 and provides a random number R production command to the crypto module 14 (step 1200). Then, since the crypto module 14 produces a random number R in accordance with this command (step 2100), the controller 16 receives this random number R and provides number CAN of the IC card 2 and, using this exclusive OR data and a prescribed master key, produces a verification key unique to the IC card 2. Then, using this verification key and the card data, the crypto module produces the verification encryption key Y (step 2200) and encrypts the random number R (step 2300) using this encryption key Y. Then, the crypto module 14 compares the encrypted data <R>' of the random number R that it has encrypted with the encrypted data <R> of the random number R that has been encrypted in the IC card 2 (step 2400). If both encrypted data match, the crypto module 14 determines that the IC card 2 that is loaded in the IC card drive 12 is normal (step 2500). It is to be noted that if both encrypted data do not match, the controller 16 determines that there is a verification error and so, control proceeds to the process of step 280.

Upon completion of the above-mentioned verification of the IC card 2 in the crypto module 14 side, the controller 16 requests the crypto module 14 to generate the verification data that is used in the IC card side 2 for verifying the crypto module 14 (step 1500). Accordingly, the crypto module 14 produces an crypto module verification key SC possessed by the IC card 2 by using the exclusive OR (CSN XOR CAN) of the serial number CSN and application number CAN of the IC card 2, and a prescribed IC card key. Furthermore, the crypto module 14 encrypts this key SC by using the verification encryption key Y that has been generated in step 2200 to thereby produce verification data SC' (step 2600).

Then, when the verification data SC' is generated as mentioned above, the controller 16 reads this verification data SC' and sends it to the IC card 2 together with a verification execution command (step 1600). Then, the IC card 2 decrypts the received verification data SC' using the verification encryption key Y that has been produced in step 3200 and determines whether the decrypted verification data SC' (=SC) matches the key it possesses (step 3400). When the verification data SC', SC match, the IC card 2 determines that the crypto module 14 (in other words, the vehicle-mounted device 10) of the vehicle-mounted device 10 loaded with the IC card 2 is normal (step 3500). When the IC card side 2 also verifies that the crypto module 14 is normal, the controller 16 determines that the mutual verification has been successfully performed (step 1700) and control then proceeds from step 210 to step 220. Conversely, when the crypto module 14 is not positively verified by the IC card 2 side, the controller 16 determines that this mismatch is a verification error and control proceeds to step 280.

Figure 6:
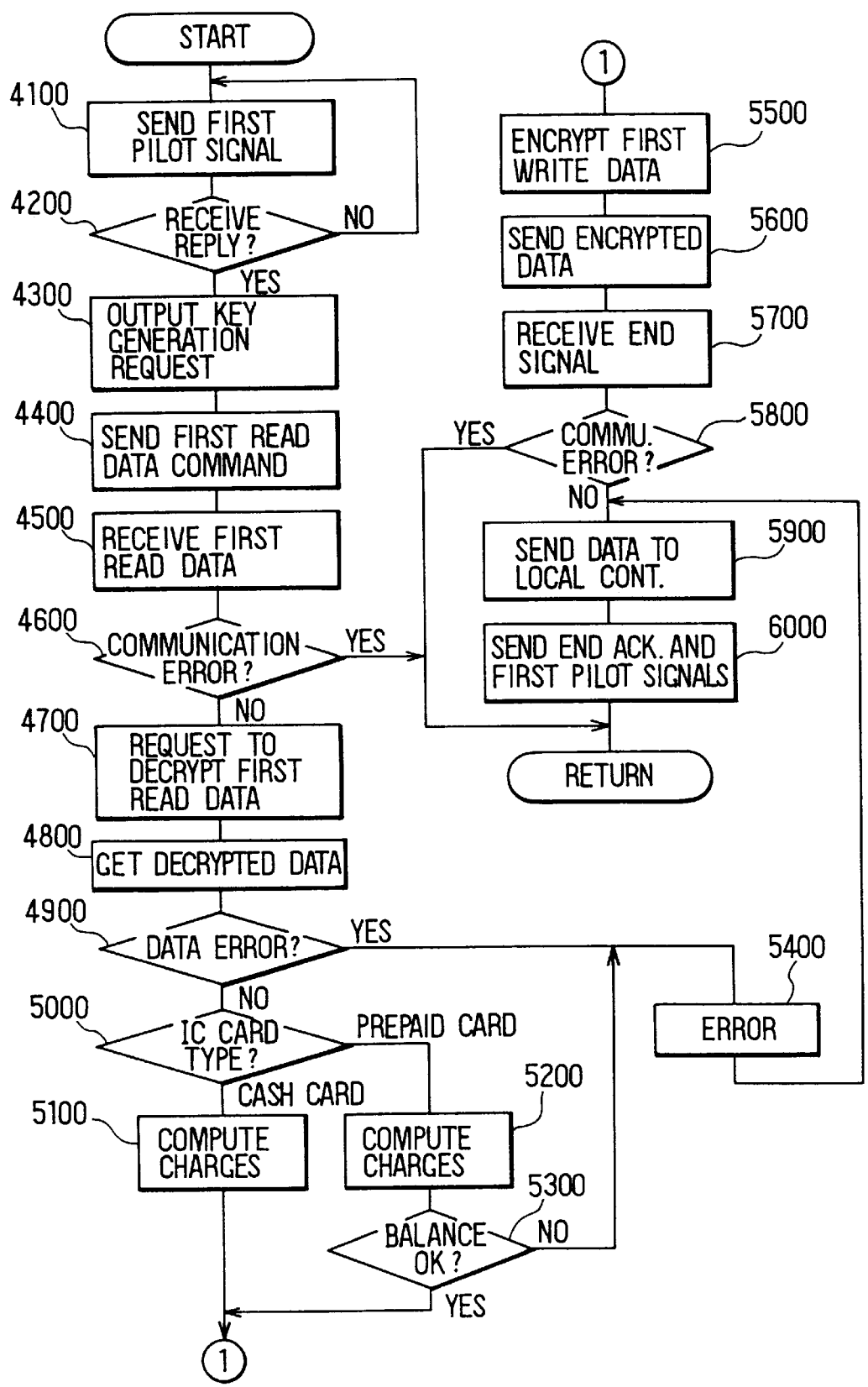
FIG. 6 is a flowchart illustrating the communication process which is executed by a communication device provided in a first gantry of the roadside device.

Next, FIG. 6 is a flowchart illustrating the communication process that is executed in transceivers 32, 34, respectively, which are provided in the first gantry 30 of the roadside device 20. It is to be noted that the subsequent explanation is made under the assumption that the following communication process is executed by the transceiver 32.

As illustrated in FIG. 6, in step 4100 transmits a first pilot signal for activating the vehicle-mounted device 10 which is being kept in a sleep state. Thereafter, while transmitting a carrier wave signal which will be used by the vehicle-mounted device 10 in sending back a response signal during the prescribed time period T2, step 4200 determines whether a first pilot response signal has been received by the antenna 32a or not. When no first pilot response signal is received, control goes back again to step 4100 which again transmits the first pilot signal. In this way, the transceiver 32 transmits the first pilot signal for every prescribed time period t.

Figure 7:
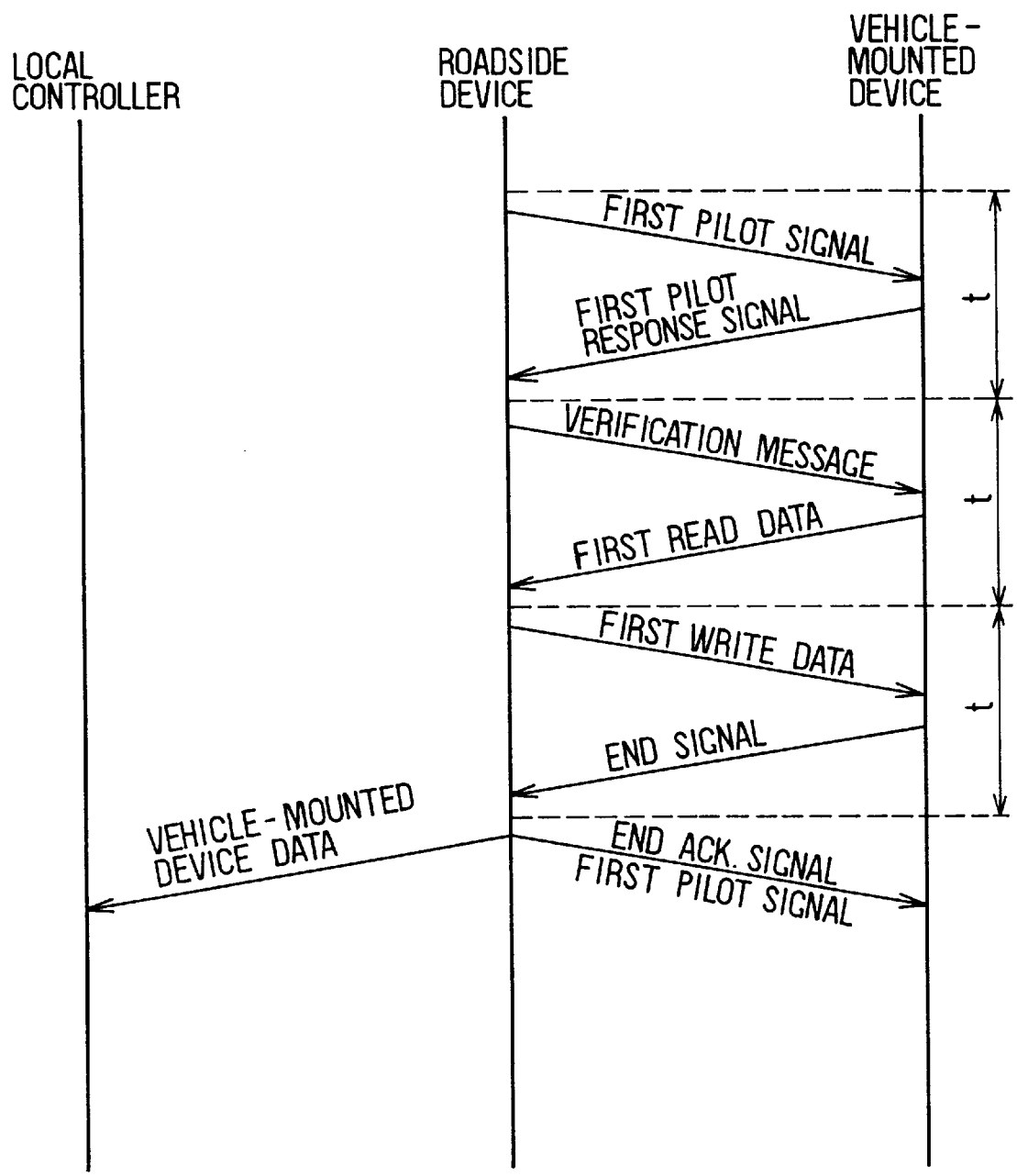
FIG. 7 is a chart illustrating the flow of data communication between the communication device provided in the first gantry and the vehicle-mounted device.

That is, when a vehicle approaches the vicinity of the first gantry 30 and enters the communication area of the transceiver 32 that corresponds to the vehicle lane along which the vehicle is travelling, the vehicle-mounted device 10 installed in the vehicle receives the first pilot signal from the transceiver 32 and is activated from its sleep state. Then, as illustrated in FIG. 7, the vehicle-mounted device 10 sends back the first pilot response signal in response to this first pilot signal. Therefore, in steps 4100 and 4200, the transceiver 32 transmits the first pilot signal periodically to thereby determine whether the first pilot response signal has been received during this periodic transmission operation. In this way, the transceiver 32 keeps on waiting for the entry of the vehicle into its own communication area.

Incidentally, as illustrated in TABLE 1, the first pilot signal that is transmitted by each of the transceivers 32, 34 of the first gantry 30 includes the pilot signal for starting the vehicle-mounted device 10 and a location number that indicates the transceiver from which the signal was transmitted. The first pilot response signal that is transmitted from the vehicle-mounted device 10 in response to the first pilot signal includes a response code, a random number R1 that constitutes the base of the communication key X1 used for producing the first read data, and the key number (encryption key number) Kn of the communication master key.

When the first pilot response signal that is transmitted from the vehicle-mounted device 10 in response to the first pilot signal is received, control goes to step 4300 which provides the random number R1 and encryption key number Kn contained in the first pilot response signal and a communication key X1 production command to the crypto unit 32b.

Then, based on the received random number R1 and encryption key number Kn, the crypto unit 32b uses the FX algorithm to produce the communication key X1 used by the vehicle-mounted device 10 in producing the first read data <RD1>. The crypto unit 32b also produces a random number R3, which constitutes the base of a communication key X2 which will be used by the vehicle-mounted device 10 in encrypting the next transmission data (second read data), and a key number of a communication master key (encryption key number) Kc.

Step 4400 retrieves the random number R3 and the encryption key number Kc, and transmits a roadside device verification message (see Table 1) that includes these values and a read-out command of the first read data as shown in FIG. 7.

Meanwhile, as mentioned earlier, when transmitting this roadside device verification message, the transceiver 32 subsequently transmits an unmodulated carrier signal during the prescribed time period T2. Also, as illustrated in FIG. 7, the transceiver 32 transmits the roadside device verification message, a first write data and an end acknowledge signal (described later), etc. for every predetermined time period t in the same way as when transmitting the first pilot signal during regular operation.

Next, when transmitting the roadside device verification message to the vehicle-mounted device 10 as mentioned above, since the vehicle-mounted device 10 sends back the first read data <RD1>, which has been produced beforehand when the IC card 2 is loaded therein, in response to this message as illustrated in FIG. 7, step 4500 receives the first read data <RD1> until the carrier wave transmission time period T2 elapses. Then, when the carrier wave transmission time period T2 elapses, step 4600 determines whether the first read data <RD1> has been received during this transmission time period to check if a communication error has occurred.

If a communication error has occurred, an error status code is set and after which this process is terminated temporarily. If there is no communication error, the operation proceeds to step 4700 which provides to the crypto unit 32b a command for decrypting the received first read data <RD1>. Upon reception of the request to decrypt the first read data <RD1>, the crypto unit 32b decrypts the first read data <RD1> in accordance with the FX algorithm using the communication key X1 that has been produced before based on the random number R1 and communication encryption key number Kc. In this way, after step 4700 generates the first read data <RD1> decryption command, step 4800 reads the decrypted RD1 data.

Based on a status code in this decrypted data RD1, step 4900 determines whether an error is present in the decrypted first read data RD1. If a data error is present, control proceeds to step 5400. If no data error is present in the first read data RD1, control proceeds to step 5000.

Step 5000 determines according to the first read data RD1 whether the IC card 2 in the vehicle-mounted device 10 is a prepaid card or a cash card. If the IC card 2 is a cash card, control proceeds to step 5100 which determines vehicle type based on, for example, the vehicle-mounted device code and the toll charge is calculated in accordance with the vehicle type and thereafter, control goes to step 5500. On the other hand, if the IC card 2 is a prepaid card, the operation proceeds to step 5200 which determines the vehicle type based on, for example, the vehicle-mounted device code and the toll charge is calculated in accordance with the vehicle type. Subsequent step 530 determines from the balance of the prepaid card whether the toll charge can be paid or not. Then, when step 5300 determines that the balance of the prepaid card is enough for paying the toll charge, control proceeds to step 5500. On the other hand, when step 5300 determines that the balance of the prepaid card is not enough for paying the toll charge, control goes to step 5400.

Meanwhile, if there is an error in the decrypted first read data RD1 or if no toll charge can be collected from the IC card 2(specifically the prepaid card), step 5400 performs an error processing for transmitting an error data to this effect to the vehicle-mounted device 10 side and also setting an error status code. Upon completion of this error processing, the operation proceeds to step 5900.

Next, step 5500 generates a first write data WD1 for collecting the toll charge from the vehicle-mounted device 10 side and provides the data to the crypto unit 32b and thus, the transceiver 32 drives the crypto unit 32b to encrypt the first write data WD1. After the crypto unit 32b encrypts the first write data WD1, the transceiver 32 retrieves this encrypted first write data <WD1> and transmits it to the vehicle-mounted device 10 as shown in FIG. 7. It is to be noted that during this transmission the transceiver 32 also transmits an unmodulated carrier wave signal during the prescribed time period T2 after transmitting the modulated signal that corresponds to the first write data <WD1>.

Here, for example, as illustrated in Table 1, the first write data WD1 includes the write command for storing the payment result of the toll charge into the IC card 2 in the vehicle-mounted device 10 side, the vehicle-mounted device code, the total sum of the toll charges, the location number of the transceiver 32, the transaction type that indicates the type of charge collection (namely, flat charge collection, charge collection varying according to distance travelled, or time dependent charge collection), and the date and time.

Among these data items, the vehicle-mounted device code, the total sum of the toll charges and part of the location number are respectively encrypted and the remaining data items are left untouched as unencrypted regular transmission data (first write data <WD1>).

Also, when encrypting this first write data WD1, the crypto unit 32b performs its encryption processing in accordance with the FX algorithm using the communication key X1 generated before. That is, since the crypto unit 32b (also crypto unit 34b) is used only for communicating with the vehicle-mounted device 10, unlike the crypto module 14 in the vehicle-mounted device 10 side, the crypto unit 32b performs the production of the keys as well as the encryption and decryption of the data by using only the FX algorithm which is the communication encryption algorithm.

Next, after receiving the transmitted first write data <WD1>, the vehicle-mounted device 10 transmits an end signal which includes the response code to this effect as illustrated in FIG. 7. Therefore, after transmitting the first write data <WD1>, the transceiver 32 executes the end signal reception processing (step 5700) during the prescribed time period T2. After the elapse of the prescribed time period T2, step 5800 determines whether the end signal has been received to check for the presence or absence of a communication error. If there is a communication error, the transceiver 32 sets the error status code and thereafter terminates this process. If there is no communication error, control proceeds to step 5900.

Step 5900 provides the above-decrypted first read data RD1, error status that has been set in the error process (in step 5400), etc. to the local controller 26 that is built in the main body of the roadside device 20. Subsequent step 6000 transmits an end acknowledge signal to the vehicle-mounted device 10. This end acknowledge signal serves as a communication completion signal for informing the vehicle-mounted device 10 of the completion of the data communication and the first pilot signal (see FIG. 7) and thereafter this process terminates.

Meanwhile, the first pilot signal is transmitted after the end acknowledge signal as mentioned above for quickly activating the vehicle-mounted device 10 that is loaded in the vehicle that has next entered the communication area. Through this transmission operation, it is possible to prevent the delays in activating the vehicle-mounted device 10 and thus, to provide a shorter communication time.

Also, after transmitting the first pilot signal in step 6000, by performing a determination processing (not shown) similar to that of step 4200, the transceiver 32 determines whether the first pilot response signal has been transmitted by the vehicle-mounted device 10 in response to the first pilot signal. After receiving the first pilot response signal, control proceeds to step 4300 and communication with the vehicle-mounted device that has transmitted this first pilot response signal is started. When the first pilot response signal is not received, control proceeds to step 4100, whereby the operation returns to the normal operation of transmitting the first pilot signal for every prescribed time period t[msec.]

Figure 8:
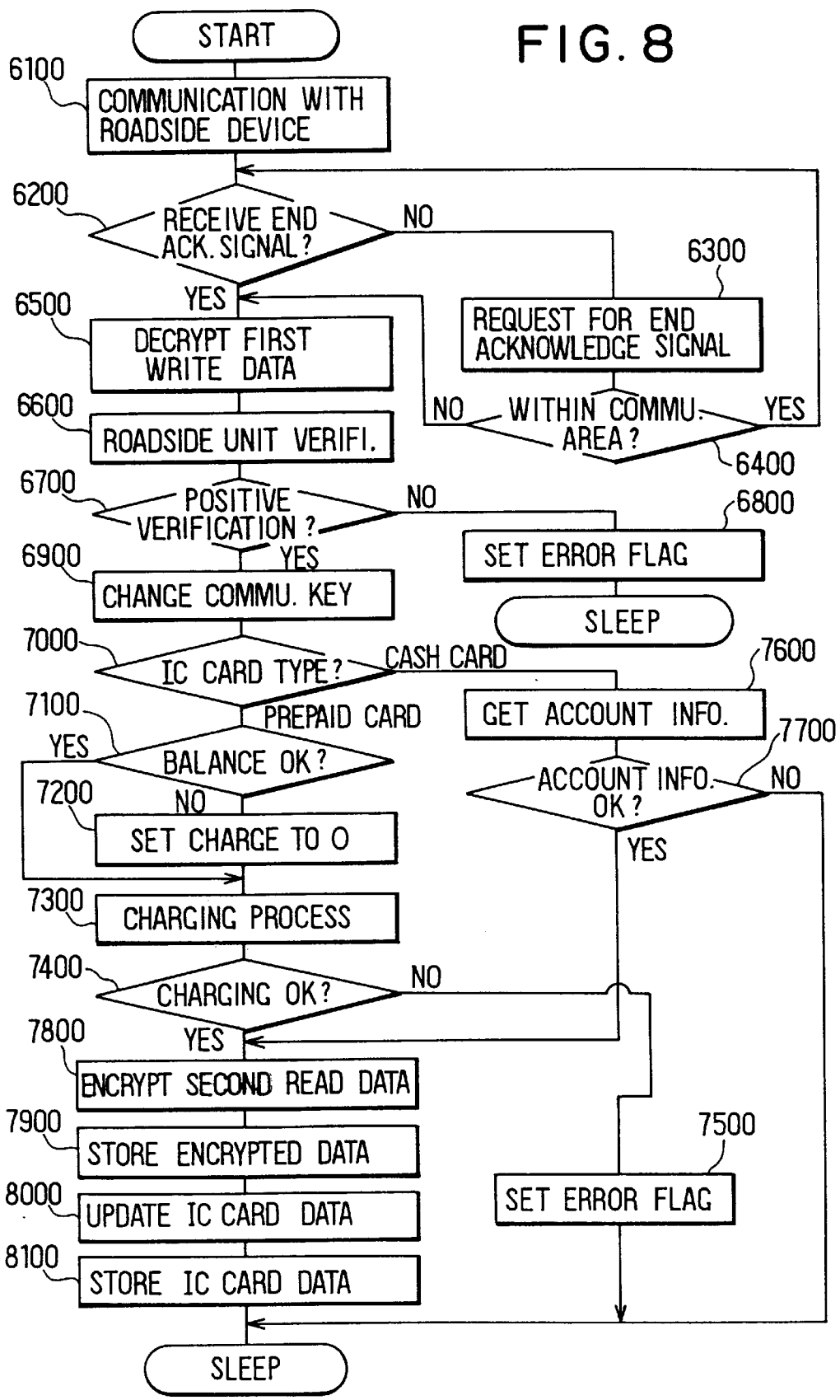
FIG. 8 is a flowchart illustrating a first gantry passage process that is executed by the vehicle-mounted device.

Next, FIG. 8 is a flowchart illustrating the data process (first gantry passage process) which is executed by the vehicle-mounted device 10 after it receives the first pilot signal from the transceivers 32, 34, . . . provided in the first gantry 30 and after executing the communication processing with the transceiver that transmitted the first pilot signal following the above-mentioned procedure.

As shown in FIG. 8, in the vehicle-mounted device 10, the communication circuit 18 activates the controller 16 after receiving the first pilot signal from the transceiver of the first gantry 30, e.g., the transceiver 32. Then, step 6100 executes a communication process for performing data communication with the transceiver 32 via the communication circuit 18. Upon receipt of the first write data <WD1> from the transceiver 32, the controller 16 transmits the end signal via the communication circuit 18, terminates the communication processing (step 6100) and executes the first gantry passage process of step 6200 and subsequent step s.

Step 6200 determines whether the communication circuit 18 has received the end acknowledge signal from the transceiver 32. If the controller 16 has not yet received the end acknowledge signal, control proceeds to step 6300 in which the controller 16 transmits via the communication circuit 18 a command signal for requesting the transmission of the end acknowledge signal using the unmodulated carrier wave signal, which succeeds the first pilot signal or a transmission signal to the vehicle-mounted device 10 and which is transmitted by the transceiver 32 for every predetermined time period t.

Also, subsequent step 6400 determines whether the transmission signal such as the first pilot signal from the transceiver 32 has been received by the communication circuit 18; in other words, the controller 16 determines whether or not the vehicle has left the communication area of the transceiver 32. If the vehicle is still inside the communication area, control again proceeds to step 6200 which determines whether the transceiver 32 has transmitted the end acknowledge signal in response to the above-mentioned request signal.

If no end acknowledge signal has been received, control again proceeds to step 6300. Thereafter, steps 6200 to 6400 are repeated until the vehicle goes out of the communication area of the transceiver 32 or the end acknowledge signal is received.

That is, if the end acknowledge signal cannot be received when passing the first gantry 30 after completing communication with the transceiver 32, the controller 16 transmits the end acknowledge signal request signal to the transceiver 32 to direct the same transceiver 32 to again transmit the end acknowledge signal.

As a result, in the vehicle-mounted device 10 side, the controller 16 can reliably verify the completion of the communication with the transceiver 32. Even if no end acknowledge signal is received, the controller 16 can inform the roadside device 20 about this matter via the transceiver 32. This enables mutual verification of a communication error between them.

When the controller 16 receives the end acknowledge signal or the vehicle departs from the communication areas of the transceivers 32, 34, . . . of the first gantry 30, control goes to step 6500 which generates to the crypto module 14 a command to decrypt the first write data <WD1> received from the roadside device 20. Then, since the crypto module 14 decrypts the first write data <WD1> in accordance with the FX algorithm using the communication key X1, subsequent step 6600 reads out the decrypted first write data WD1 and verifies the roadside device 20 (more specifically, the transceiver that has transmitted the first write data WD1) based on the vehicle-mounted device code contained in the first write data WD1 and the vehicle-mounted device code of the vehicle-mounted device 10.

Step 6700 determines if the verification result of step 6600 for the roadside device 20 is positive or not. If the two vehicle-mounted device codes do not match and as a result, step 6700 determines that the roadside device cannot be positively verified, step 6800 sets an error status code to this effect and then, the controller 16 enters a sleep mode. If step 6700 determines the positive verification of the roadside device 20 when both vehicle-mounted device codes match, control proceeds to step 6900.

When step 6900 sends the random number R3 and encryption key number Kc received during the previous data communication from the roadside device 20 side to the crypto module 14, the crypto module 14 is driven by the controller 16 to produce the communication key X2 used for the next data communication and changes the communication key from X1 to X2. It is to be noted that after receiving the random number R3 and the encryption key number Kc, the crypto module 1 generates the communication key X2 in accordance with the FX algorithm using data and the communication master key that corresponds to the random number R3 and the encryption key number Kc.

When the communication key is changed from X1 to X2 as mentioned above, step 7000 determines the type of the IC card 2. If the IC card 2 is a prepaid card, step 7100 determines whether the prepaid card has enough balance for paying the toll charge. If the balance is insufficient, step 7200 sets the toll charge sum to zero and control goes to step 7300. If the balance is sufficient for the payment of the toll charge, control goes to step 7300.

Step 7300 executes a toll charging process for subtracting the toll charge from the IC card 2 which is a prepaid card and step 7400 determines whether the toll charge has been properly subtracted from the IC card 2. If the toll charge cannot be subtracted from the prepaid card, that is, if the balance in the prepaid card is insufficient or the normal execution of the toll charging process has failed, control proceeds to step 7500 which sets an error status flag and thereafter, the controller 16 enters a sleep mode. Conversely, if the toll charge has been successfully and properly subtracted, control proceeds to step 7800.

Also, when step 7000 determines that the IC card 2 is a cash card, control proceeds to step 7600 which reads out the account data for the payment of the toll charge using the cash card, and then control goes to step 7700 which determines whether the retrieved account data is proper or not. When the account data is improper, the controller 16 enters a sleep mode and, when the account data is proper, control proceeds to step 7800.

Next, step 7800 provides to the crypto module 14 the vehicle-mounted device data (second read data) RD2 which will be next transmitted to the roadside device 20 and drives the crypto module 14 to encrypt this second read data RD2 using the communication key that has been changed to X2 by step 6900. It is to be noted that the FX algorithm is again used for this encryption operation. After the second read data RD2 is encrypted by the crypto module 14, step 7900 stores the encrypted data <RD2> as the next transmission data and step 8000 stores payment data, e.g., date, time and place at which the toll charge has been paid, to the IC card 2 to update the card data. Step 8100 reads the updated card data and stores the updated data and thereafter, the controller 16 enters a sleep mode.

Here, incidentally, the toll charging process (step 7300) for subtracting the toll charge from the prepaid card and the card data updating process (step 8000) for updating the data of the IC card are executed using the data that has been encrypted in accordance with the DES algorithm using the above-mentioned toll charging key Z that is stored beforehand.

Meanwhile, for example, as shown in Table 2, the second read data RD2 that is encrypted in step 7800 and stored as the transmission data in step 7900 includes the response code to the communication device of the roadside device 20, cash card file data (account data, etc.) in case the IC card 2 is a cash card, status code such as an error status code that indicates the operational state of the vehicle-mounted device 10 side, payment method, collection result of the toll charge, vehicle-mounted device code, application number CAN of the IC card 2, the random number R3, toll charge collection verification data for proving that the toll charge collection has been performed in the vehicle-mounted device 10 side, and the like. Among these data items, the response code and part of the cash card file data are left as is in their unmodulated ordinary state while all the remaining data items are encrypted.

While the second read data RD2 is encrypted in accordance with the FX algorithm in the same way as that of the first read data RD1, it must be noted here that among the data items of the second read data RD2, the toll charge card 2 side in accordance with the DES algorithm using the IC card key and therfore, this verification data is twice encrypted by being further encrypted during transmission time using the FX algorithm.

Figure 10:
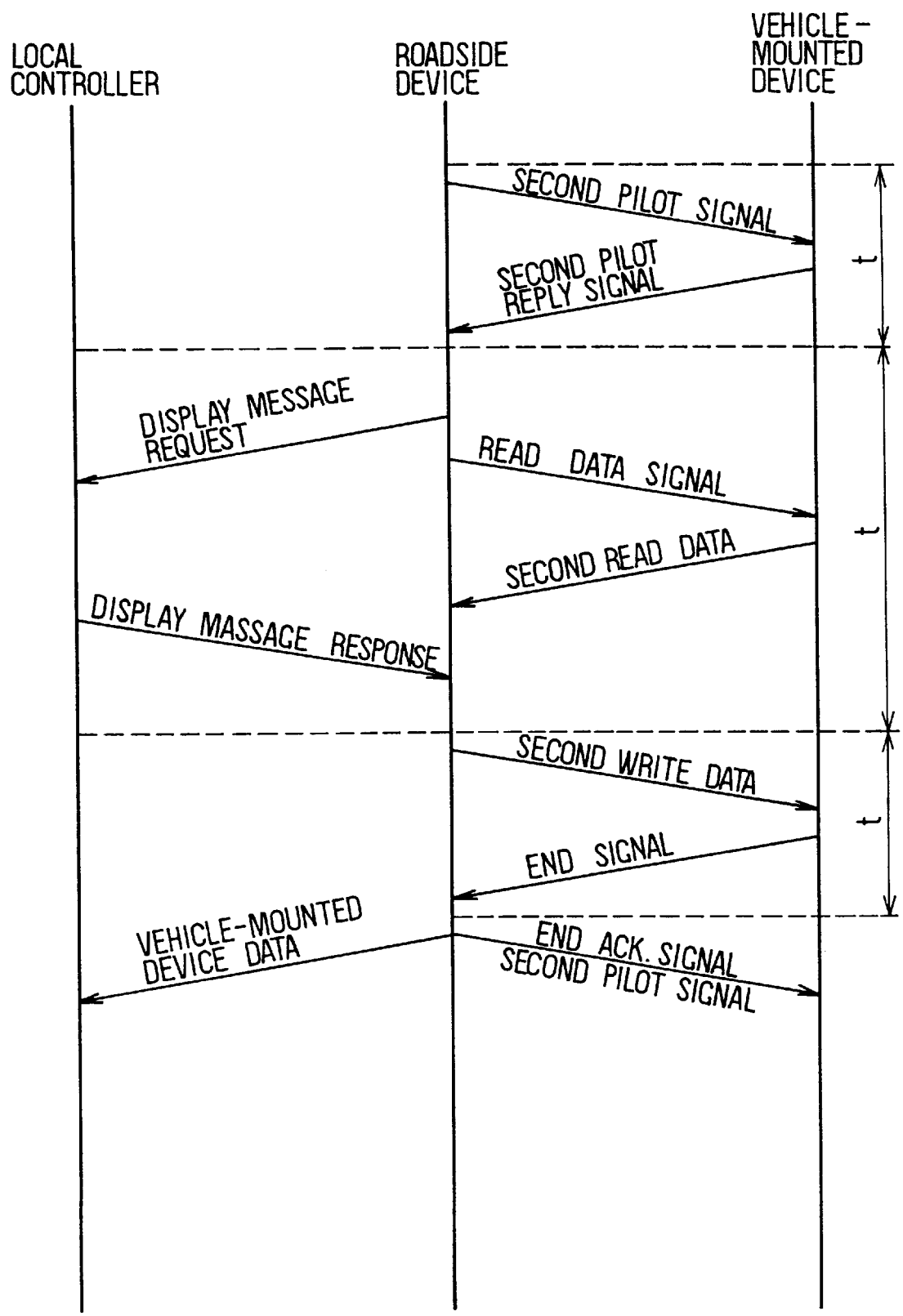
FIG. 10 is a chart illustrating the flow of data communication between the communication device provided in the second gantry and the vehicle-mounted device.

Next, FIG. 10 is a flowchart illustrating the communication process that is executed in the transceivers 42, 44, . . . which are provided in the second gantry 40 of the roadside device 20. It is to be noted that in the following explanation, it is assumed that this process is executed by the transceiver 42.

card, etc. to thereby produce the display message that is to be transmitted to the vehicle-mounted device 10 side and transmits it to the transceiver 42 (see FIG. 10).

Next, step 9500 sends a data read request signal to the vehicle-mounted device 10 for requesting the transmission of the second read data <RD2> and thereafter, step 9600 executes a process for waiting the reception of the second read data <RD2> from the vehicle-mounted device 10 while transmitting the unmodulated carrier wave signal during the

TABLE 2

| 2ND GANTRY COMMU. SIGNALS | CONTENTS |
|---|---|
| 2ND PILOT SIGNAL (ROADSIDE DEVICE) | 2ND PILOT SIGNAL LOCATION NO. |
| 2ND PILOT RESPONSE SIGNAL (VEHICLE-MOUNTED DEVICE) | RESPONSE CODE PAYMENT MODE DATA |
| DATA RETRIEVAL SIGNAL (VEHI-MTD.) | DATA RETRIEVAL COMMAND |
| 2ND READ DATA (ROADSIDE DEVICE) | RESPONSE CODE CASH CARD FILE* (PARTLY ENCRYPTED) STATUS CODE* MODE OF PAYMENT* CHARGE COLLECTION RESULT* VEHICLE-MOUNTED DEVICE CODE* CSN* RANDOM NUMBER R3* TOLL COLLECTION PROOF DATA* |
| 2ND WRITE DATA (ROADSIDE DEVICE) | WRITE COMMAND DISPLAY COMMAND DISPLAY MESSAGE |
| END SIGNAL (VEHI-MTD DEVICE) | RESPONSE CODE |
| END ACK. SIGNAL (ROADSIDE DEV.) | END ACKNOWLEDGE |

NOTE: *DENOTES DATA ENCRYPTED IN THE VEHICLE-MOUNTED DEVICE

Figure 9:
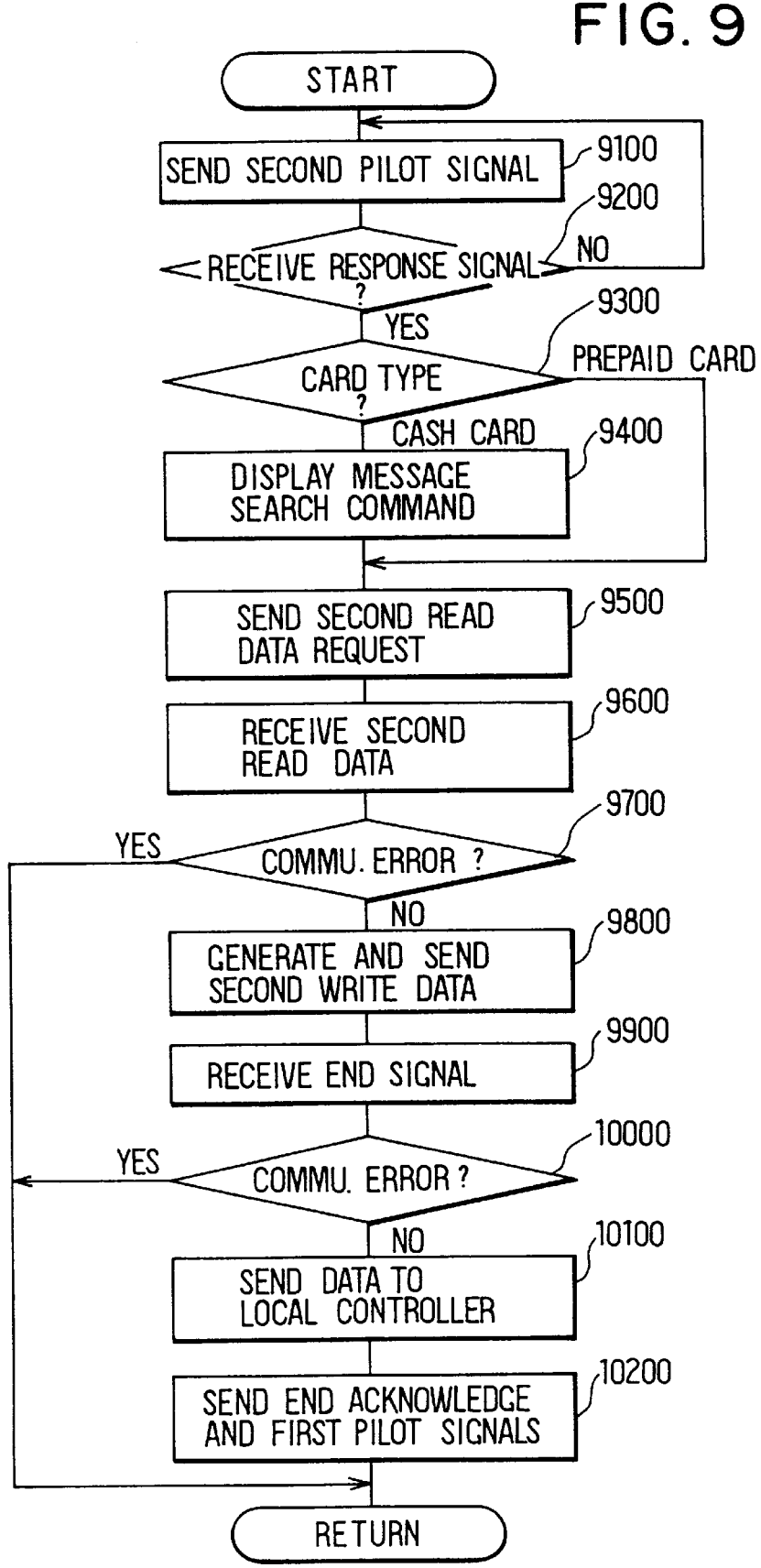
FIG. 9 is a flowchart illustrating a communication process that is executed by a communication device provided in a second gantry of the roadside device.

As illustrated in FIG. 9, as in the case of the transceivers 32, 34, . . . of the first gantry 30, step 9100 transmits the second pilot signal for starting the vehicle-mounted device 10 which is in a sleep mode. While transmitting during the prescribed time period T2 the carrier wave signal which will be used by the vehicle-mounted device 10 for sending the response signal, step 9200 determines whether the second pilot response signal has been received by the antenna 42a or not. While no second pilot response signal is received, the transceiver 42 keeps on transmitting the second pilot signal for every predetermined time period t[msec.] in such a way that control goes back again to step 9100 for transmitting the second pilot signal.

When the vehicle-mounted device 10 receives the second pilot signal and is activated from the sleep state, it transmits the second pilot response signal in response to this second pilot signal as illustrated in FIG. 10. Then, after receiving this response signal, control proceeds to step 9300 which determines the type of the IC card 2 loaded in the vehicle-mounted device 10 based on the pilot response signal. That is, since the vehicle-mounted device 10 is arranged to transmit the payment mode data representing the response code and the charge collection method as the second pilot response signal (see Table 2) after receiving the second pilot signal, the transceiver 42 determines from this payment mode data whether the IC card 2 on the vehicle-mounted device 10 side is a cash card or a prepaid card.

If the IC card 2 is a prepaid card, control proceeds to step 9500. If the IC card 2 is a cash card, step 9400 provides a display message search command to the local controller 26 of the main body of the roadside device 20 for searching a display message to be sent to the vehicle-mounted device 10 and thereafter, control proceeds to step 9500. It is to be noted that upon receipt of this display message search command, the local controller 26 searches the state of use of the cash prescribed time period T2. When the prescribed time period T2 has elapsed, step 9700 determines the occurrence or non-occurrence of a communication error by determining whether step 950 has succeeded in its reception of the second read data <RD2>. When there is a communication error, the transceiver 42 sets an error status code and then this process terminates for the time being.

On the other hand, when the vehicle-mounted device 10 transmits the second read data <RD2> in response to the data read signal that has been transmitted by step 9500, control proceeds to step 9800 which generates a second write data WD2 and provides the same data to the vehicle-mounted device 10. As shown in Table 2, the second write data WD2 includes write/display commands for driving the vehicle-mounted device 10 to store and display information to indicate that the second read data <RD2> has been received by the second gantry 40, the display message retrieved and produced in the local controller 26 when the IC card 2 is a cash card or the like.

Since the vehicle-mounted device 10 transmits the end signal consisting of the response code as illustrated in FIG. 10 after receiving the second write data WD2, step 9900 executes the reception processing in which it waits for the transmission of the end signal from the vehicle-mounted device 10 while transmitting the unmodulated carrier wave signal during the prescribed time period T2. When the prescribed time period T2 elapses, step 10000 determines the presence of a communication error by determining whether step 9900 has succeeded in receiving the end signal.

When there is a communication error, the transceiver 42 sets an error status flag and then this process terminates. If there is no communication error, step 10100 sends the vehicle-mounted device data, namely, the second read data <RD2> received from the vehicle-mounted device 10 to the local controller 26 and subsequent step 10200 sends the end acknowledge signal and the second pilot signal (see FIG. 11) to the vehicle-mounted device 10 and then this process terminates.

Incidentally, after step 10200 has transmitted the second pilot signal, as in the case of the processing executed by the transceiver 32, 34, . . . of the first gantry 30, the transceiver 42 executes determination processing (not shown) similar to step 9200 for determining if the second pilot response signal has been transmitted from the vehicle-mounted device 10 side in response to the second pilot signal. When the transceiver 42 receives the second pilot response signal, control proceeds to step 9300. When the transceiver 42 fails to receive the second pilot response signal, control proceeds to step 9100.

Also, the second read data <RD2> that is sent by step 10100 to the local controller 26 is encrypted data that has been encrypted in accordance with the FX algorithm and the charge collection verification data contained therein is one which has been further encrypted in accordance with the DES algorithm. Therefore, the charge collection verification data is decrypted using the built-in encryptor of the local controller 26. When the charge collection verification data that has been decrypted using the FX algorithm is further decrypted using the DES algorithm, the local controller 26 determines the encryption key used by the IC card 2 during the encryption of the charge collection verification data in the following manner and uses this encryption key to decrypt the charge collection verification data. The local controller 26 determines the IC card key unique to the IC card 2 loaded in the vehicle-mounted device 10 using the index of the key in the first read data RD1 from the vehicle-mounted unit 10 and subsequently generates the decryption key.

Figure 11:
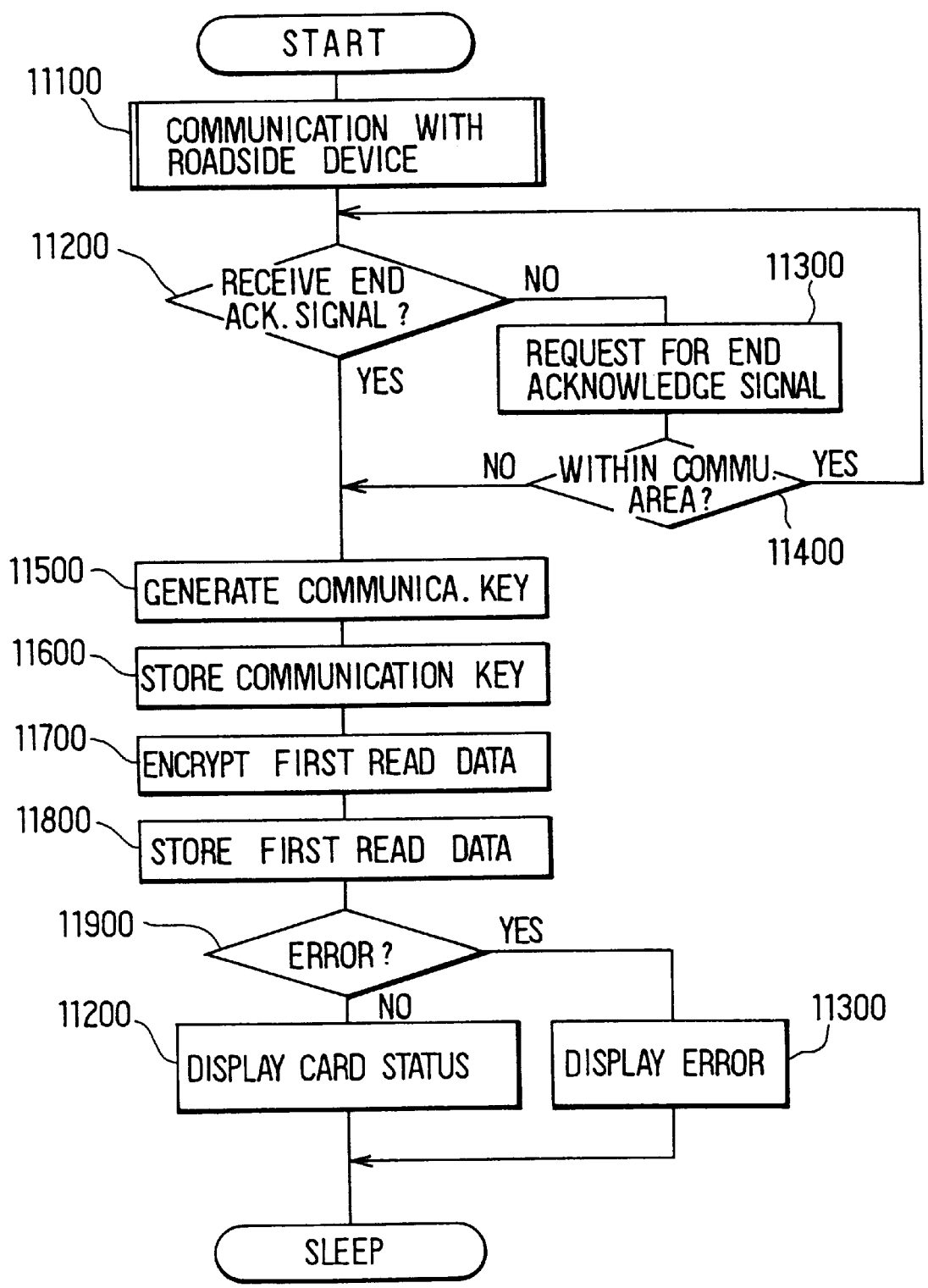
FIG. 11 is a flowchart illustrating a second gantry passage process that is executed in the vehicle-mounted device.

When the vehicle-mounted unit 10 activates after receiving the second pilot signal from the transceivers 42, 44, . . . of the second gantry 40 and the same vehicle-mounted unit 10 performs communication with the transceiver that sent the second pilot signal based on the above-mentioned procedure, the controller 16 of the vehicle-mounted device 10 executes a data processing procedure (second gantry 40 passage processing) which is shown by the flowchart of FIG. 11.

As illustrated in FIG. 11, when step 11100 receives the second write data WD2 via data communication with transceivers 42, 44, . . . of the second gantry 40 and transmits the end signal to thereby terminate the data communication, step 11200 determines whether the end acknowledge signal has been received or not in the same way as during the time of completion of the communication with the first gantry 30. If the end acknowledge signal has not been received, step 11300 transmits the end acknowledge signal transmission request signal by utilizing the unmodulated carrier wave signal the transceiver 42, 44, . . . has sent. Furthermore, step 11400 determines whether the vehicle has left the communication area of the second gantry 40. If the vehicle is still within this communication area, control proceeds to step 11200. After the termination of the communication processing of step 11100, steps 11200 and 11400 are repeatedly executed until the vehicle leaves the communication area of the second gantry 40 or the controller 16 succeeds in its reception of the end acknowledge signal.

When the end acknowledge signal is received or when the vehicle has left the communication area of the second gantry 40, control proceeds to step 11500 which makes the crypto module 14 produce again the communication key X1 for encrypting the transmission data as in the case of step 290 mentioned previously and step 11600 stores this communication key X1. Step 11700 reads the vehicle-mounted device data (first read data) RD1 that is to be transmitted next to the roadside device 20 and makes the crypto module 14 encrypt such data using the communication key X1 while step 11800 stores the encrypted first read data <RD1>. It is to be noted that the procedure for the production of the communication key X1 and the encryption operation of the first read data RD1 in the crypto module 14 are completely the same as those executed when the IC card 2 is loaded in the IC card drive 12. The only difference between them is that among the vehicle-mounted device data items that are included in the first read data RD1, the content of the data item regarding the IC card 2 is changed to the charged content that is stored by step 8100.

When the above-encrypted first read data <RD1> is stored, step 11900 checks the state of the vehicle-mounted device 10 based on, for example, the error status flag that is set when there is an error. If there is an error, control proceeds to step 11300 which informs the passenger of the error using a buzzer or the like. If there is no error, control proceeds to step 11200 which informs the passenger of the vehicle of the state of the card using a buzzer and display device. Then, the controller 16 enters a sleep mode. It is to be noted that the displayed content of the state of the card is, for example, the balance of the card if the IC card 2 is a prepaid card. If the IC card 2 is a cash card, the contents of the display is, for example, the amount used and the message included in the second write data WD2.

Figure 12:
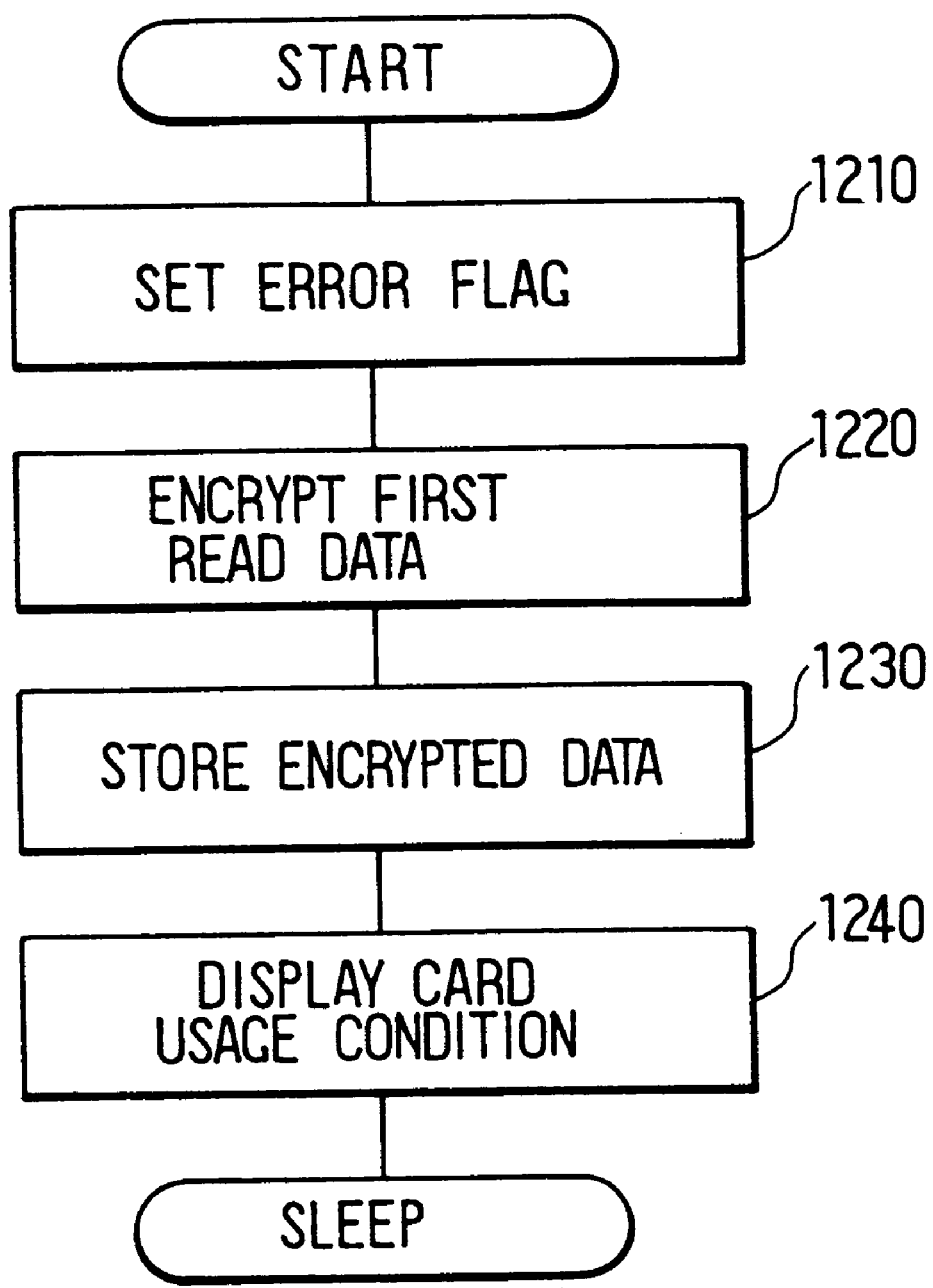
FIG. 12 is a flowchart illustrating a process that is executed by the vehicle-mounted device when the IC card is removed from its drive.

Next, FIG. 12 is a flowchart illustrating the data process (card removal process) executed by the controller when the IC card 2 is removed from the IC card drive 12 of the vehicle-mounted device 10. It is to be noted that this process is started when the removal of the IC card 2 has been detected by a sensor provided in the IC card drive 12 and the resulting detection signal has been provided to the controller 16 to activate this same controller 16.

As illustrated in FIG. 12, when this process is started, step 12100 first sets an error status flag that indicates that the IC card 2 has been removed and that the vehicle-mounted device 10 has no card for paying the toll charge.

Subsequent step 12200 reads the vehicle-mounted device data after the setting of the error status flag to update the content of the post-encryption first read data <RD1> to correspond with the error status flag. Then, step 12200 provides the vehicle-mounted device data to the crypto module 14 to drive the same to generate the encrypted first read data <RD1>.

When the first read data <RD1> is produced by the crypto module 14, step 12300 updates the first read data <RD1> as the transmission data that will be next transmitted to the roadside device 20 and after step 12400 displays the state of use of the extracted IC card 2, etc., the controller 16 enters a sleep mode.

As explained above, in the toll road toll charging system according to the present embodiment, the timing at which the vehicle-mounted device 10 performs the encryption of the transmission data and the decryption of the reception data is the timing when the IC card 2 for payment of the charge is loaded in the IC card drive 12, the time interval from the completion of the communication procedures between the controller 16 and the transceivers 32, 34, . . . provided in the first gantry 30 of the roadside device 20 up to the entry of the vehicle into the communication area of the transceivers 42, 44, . . . provided in the second gantry 40, after the completion of communications with the second gantry 40 and the time when the IC card 2 is removed from the IC card drive 12. That is, the controller 16 performs no encryption nor decryption during the communication with each of the roadside device 20 side transceivers 32, 34, . . . and 42, 44, . . . Also, similarly, regarding the reading of the card information from the IC card 2 and the updating of the card data, the controller 16 does not perform encryption and decryption operations during communication with each of the roadside device 20 side transceivers 32, 34, . . . and 42, 44, . . . .

In this way, it is possible to drastically decrease the processing time consumed by the vehicle-mounted device 10 during data communication with the roadside device 20 and thus, the time period needed for the execution of the data communication can be decreased. This enables data communication to be executed accurately for a short period of time without limiting the travel speed of the vehicle or changing the crypto module 14 to an expensive one that enables the execution of high-speed processing.

Also, when the IC card 2 has been loaded in the IC card drive 12, the vehicle-mounted device 10 executes the mutual verification procedure between the IC card 2 and the crypto module 14 and transmits the status information (error status) that represents the result of this verification procedure to the roadside device 20 as one item of the vehicle-mounted device data. Therefore, in case the IC card 2 or vehicle-mounted device 10 itself is forged, it is possible to detect this information in the roadside device 20. Accordingly, it is possible to control cheating of the vehicle passenger and thus, charge collection can be performed properly.

Also, while data is encrypted using the DES algorithm that is employed generally in the art when such mutual verification or writing of the data into the IC card 2 is performed, during communication between the vehicle-mounted device 10 and the roadside device 20, data is encrypted in accordance with the FX algorithm which is different from and which enables higher speed encryption than the DES algorithm.

For this reason, in transceivers 32, 34, . . . provided in the first gantry 30, it is possible to shorten the amount of time needed during data communication for performing the encryption of the transmission data and the decryption of the reception data, and thus, data communication can be performed at higher speeds and at higher levels of accuracy. Also, especially, if the previously mentioned encryption algorithm called "SAFER·K-64" or "FEAL" is used as the FX algorithm, the encryption unit can be implemented comparatively cheaply through a hardware construction. In this way, because the amount of time needed for performing the encryption operation can be shortened, and therefore the use of such an encryption algorithm is very effective.

Also, as mentioned previously, in the present embodiment, the FX algorithm that is different from the DES algorithm, which is generally used, is used for the data communication between the vehicle-mounted device 10 and the roadside device 20 communication device. For this reason, even when the communication signal gets intercepted, it will be difficult to decrypt this same signal. This enhances communication security. In addition, in the present embodiment, when encrypting the transmission data, the entire data is not encrypted and part thereof is left as is in an ordinary unencrypted manner and furthermore, the communication keys (X1, X2) are each updated based on the use of the random number that is generated each time it is used. In this way, the data becomes more difficult to decrypt. This enables the further enhancement of the communication security.

Also, since the communication keys X1 and X2 are set in each of the vehicle-mounted device 10 and the roadside device 20 communication device, even when the vehicle passenger tries to cheat paying toll charges by using a transmitter that generates a signal that is obtained by copying the transmission signal from the authorized vehicle-mounted device 10, this unlawful operation can be reliably detected in the roadside device 20 and thus, communication security can be enhanced.

On the other hand, in the present embodiment, errors such as the result of the above-mentioned mutual verification which have occurred in the vehicle-mounted device 10 side are all transmitted as errors to the roadside device 20 side. Also, when an error has been detected by the roadside device 20, information on the presence of the error is similarly transmitted to the vehicle-mounted device 10. Therefore, both the vehicle-mounted device 10 and the roadside device 20 can know of the error and thus, both of these devices 10, 20 can employ countermeasures against this error.

Although the present invention has been fully described in connection with a preferred embodiments thereof with reference to the accompanying drawings, it is to be noted that various changes and modifications will become apparent to those skilled in the art.

For example, while the above described embodiment presents the case where the roadside device 20 provided at the entrance or exit of the toll road receives via data communication with the vehicle-mounted device 10 the uniform toll charge which varies depending on the type of the vehicle but is uniform with respect to the travelled distance and travel time, it goes without saying that the present invention can be applied also to a toll road toll charging system in which the toll charge is set in accordance with the travelled distance or the travel time.

In this case, in order to enable the collection of the toll charge at the exit of the toll road in accordance with the travelled distance and the travel time, an entrance gantry constructed as in the case of the first gantry 30 at the entrance of the toll road may be provided. Such entrance gantry may perform the transmission and reception of the signals having constructions as illustrated in Table 3 between the vehicle-mounted device 10 loaded in the vehicle that passes through it. Further, a first exit gantry and a second exit gantry constructed as in the same way as that of the first gantry 30 and second gantry 40 in the exit of the toll road may be provided for performing the transmission and reception of the signals, whose formats are illustrated in Tables 4 and 2 and which are explained in connection with the above-mentioned embodiment, with the vehicle-mounted device 10 loaded in the vehicle that passes by to collect toll charges.

TABLE 3

| ENT. GANTRY COMMU. SIGNALS | CONTENTS |
|---|---|
| ENTRY PILOT SIGNAL (ROADSIDE DEVICE) | PILOT SIGNAL LOCATION NO. |
| ENTRY PILOT RESPONSE SIGNAL (VEHICLE-MOUNTED DEVICE) | RESPONSE CODE RANDOM NUMBER R1 ENCRYPTION KEY Kn |

TABLE 3-continued

| ENT. GANTRY COMMU. SIGNALS | CONTENTS |
| --- | --- |
| DATA RETRIEVAL SIGNAL (VEHI-MTD) | DATA RETRIEVAL COMMAND |
| ENTRY READ DATA | RESPONSE CODE |
| (ROADSIDE DEVICE) | STATUS CODE* |
|  | MODE OF PAYMENT* |
|  | VEHICLE-MOUNTED DEVICE CODE* |
| ENTRY WRITE DATA | WRITE COMMAND |
| (ROADSIDE DEVICE) | VEHICLE-MOUNTED DEVICE CODE† |
|  | LOCATION NO. (PARTLY ENCRYPT.)† |
|  | TRANSACTION TYPE |
|  | DATE OF ENTRY |
|  | TIME OF ENTRY |
| END SIGNAL (VEHI-MOUNTED DEVICE) | RESPONSE CODE |
| END ACK. SIGNAL (ROADSIDE DEV.) | END ACKNOWLEDGE |

NOTE:
*DENOTES VEHICLE-MOUNTED DEVICE ENCRYPTED DATA
†DENOTES ROADSIDE DEVICE ENCRYPTED DATA

That is, as illustrated in Table 3, the entrance read data which includes the response code, status code, charge collection mode, vehicle-mounted device code, etc. may be generated, encrypted and stored beforehand in the vehicle-mounted device 10. Then, when the vehicle has entered the communication area of the communication device provided in the entrance gantry, the vehicle-mounted device 10 side is activated by the entrance pilot signal that is transmitted periodically and transmits the entrance pilot response signal constructed as in the case of the first pilot response signal (see Table 1) in the above-described embodiment. Then, when the communication device of the entrance gantry transmits the data read signal, the vehicle-mounted device 10 side transmits the entrance read data. On the other hand, after its reception of the entrance read data, the communication device of the entrance gantry is constructed to transmit the entrance write data which has a construction that can be obtained by removing the charged money sum from the construction of the first write data (see Table 1) in the above-mentioned embodiment. Thereafter, the communication device and vehicle-mounted device perform transmission and reception of the end signal and end acknowledge signal to complete the data communication operation.

Also, after the vehicle has passed through the entrance gantry as mentioned above, as illustrated in Table 4 (described below), the entrance data that includes the response code, vehicle-mounted device code, inlet location number, date of entry, time of entry, etc. and the first read data constructed as in the case of the first read data in the above-mentioned embodiment are produced, encrypted and stored in the vehicle-mounted device 10 as the data to be transmitted when it passes through the first exit gantry. Then, when the vehicle has entered into the communication area of the communication device provided in the first exit gantry, the vehicle-mounted device 10 is activated by the first pilot signal that is transmitted periodically from this communication device and transmits the first pilot response signal constructed as in the case of the inlet pilot response signal. Thereafter, the vehicle-mounted device 10 receives the roadside device verification message which includes the response code, random number R3 and encryption key number Kc which is transmitted from the communication device of the first exit gantry and transmits the entrance data. Further, the vehicle-mounted device receives the data readout signal that is transmitted thereafter from the roadside device side communication device and transmits the first read data. On the other hand, upon reception of this first read data, the communication device of the first exit gantry transmits the first write data which has been prepared by adding to the first write data of the above-mentioned embodiment the toll charging data that includes elapsed travel time after passing of entrance gantry or the exit number. Thereafter, the transmission and reception of the end signal and the end acknowledge signal are performed between the vehicle-mounted device and the exit gantry to complete the data communication.

TABLE 4

| 1ST EXIT GANTRY COMMU. SIGNAL | CONTENTS |
| --- | --- |
| 1ST PILOT SIGNAL | PILOT NO. |
| (ROADSIDE DEVICE) | LOCATION NO. |
| 1ST PILOT RESPONSE SIGNAL | RESPONSE CODE |
| (VEHICLE-MOUNTED DEVICE) | RANDOM NO. R1 |
|  | ENCRYPTION KEY NO. Kn |
| ROADSIDE DEVICE VERI. MESSAGE | RESPONSE CODE |
| (ROADSIDE DEVICE) | RANDOM NO. R3 |
|  | ENCRYPTION KEY NO. Kc |
| ENTRANCE DATA | RESPONSE CODE |
| (VEHICLE-MOUNTED DEVICE) | VEHICLE-MOUNTED DEV. CODE* |
|  | ENTRANCE NO.* |
|  | DATE OF ENTRY* |
|  | TIME OF ENTRY* |
| DATA RETRIEVAL SIGNAL (ROADSIDE DEV.) | DATA RETRIEVAL COMMAND |
| FIRST READ DATA | RESPONSE CODE |
| (VEHICLE-MOUNTED DEVICE) | STATUS CODE* |
|  | MODE OF PAYMENT* |
|  | VEHICLE-MOUNTED DEV. CODE* |

TABLE 4-continued

| 1ST EXIT GANTRY COMMU. SIGNAL | CONTENTS |
|---|---|
| | CSN* |
| | BALANCE (PARTLY ENCRYPTED)* |
| | CSN XOR CAN |
| | CTC |
| | INDEX OF KEY TO BE USED |
| FIRST WRITE DATA | WRITE COMMAND |
| (ROADSIDE DEVICE) | VEHICLE-MOUNTED DEV. CODE† |
| | TOTAL CHARGE† |
| | LOCATION NO.† (PARTLY ENCRYPTED) |
| | TRANSACTION TYPE |
| | DATE |
| | TIME |
| | CHARGING DATA (TIME OR EXIT NO.) |
| END SIGNAL (VEHICLE-MOUNTED DEVICE) | RESPONSE CODE |
| END ACK SIGNAL (ROADSIDE DEVICE) | END ACKNOWLEDGE |

NOTE:
*DENOTE VEHICLE-MOUNTED DEVICE ENCRYPTED DATA
†DENOTES ROADSIDE DEVICE ENCRYPTED DATA

Also, after the vehicle passes by the first exit gantry, as shown in Table 2, data that is the same as the second read data of the above-mentioned embodiment is produced, encrypted and stored in the vehicle-mounted device 10. Then, when the vehicle enters the communication area of the communication device provided in the second exit gantry, the vehicle-mounted device 10 performs data communication, which is the same as that when the vehicle-mounted device 10 side passes by the second gantry 40 in the above-mentioned embodiment, with the vehicle-mounted device 10 and thereafter writes the communication results into the IC card 2.

In this way, using the above-mentioned constructions, it is possible to perform the automatic collection of the toll charges from the IC card 2 in both systems in which the toll charge is set in accordance with the travelled distance and the system in which the toll charge is set in accordance with the travelled time. Also, the only difference between the system in which the toll charge is set in correspondence with the travelled distance and the system in which the toll charge is set in correspondence with the amount of time travelled is with respect to setting the toll charging data in the first write data illustrated in Table 4 to be either the travelled time or the exit number from which the travelled distance is known. The construction of the data transmitted and received between the vehicle-mounted device and the roadside device and patterns of transmission and reception operations are completely the same for both systems. As a result of this, the vehicle-mounted device 10 can be used for both systems.

Such changes and modifications are to be understood as being within the scope of the present invention as defined by the appended claims.

What is claimed is:

1. A communication device for installation in a vehicle to perform a communication operation with a roadside device when said communication device is within a communication area of said roadside device, said communication device comprising:

drive means for receiving an IC card that stores predetermined card data;

communication means for performing said communication operation with said roadside device by transmitting transmission data generated based on said card data to said roadside device and by receiving reception data from said roadside device when said communication device is within said communication area of said roadside device; and cryptographic means for encrypting, using a first encryption algorithm, said card data read through said drive means to generate said transmission data and for decrypting, using said first encryption algorithm, said reception data to obtain decrypted data, said cryptographic means further encrypting, using a second encryption algorithm different from said first encryption algorithm, a result of said communication operation, and storing said result of said communication operation encrypted using said second encryption algorithm in said IC card through said drive means.

2. A communication device according to claim 1 wherein said communication device is mounted on a vehicle.

3. A communication device according to claim 2, wherein said cryptographic means encrypts said card data before said vehicle enters said communication area of said roadside device.

4. A communication device according to claim 1, wherein said cryptographic means decrypts said reception data after said communication means completes said communication operations with said roadside device.

5. A communication device according to claim 2, wherein said first encryption algorithm has a higher processing speed than said second encryption algorithm.

6. The communication device according to claim 1, further comprising:

verification means for causing said cryptographic means and said IC card to perform a mutual verification operation by exchanging predetermined verification data therebetween when said IC card is inserted inside said drive means and before said cryptographic means generates said transmission data, wherein said cryptographic means generates said transmission data including a result of said mutual verification operation.

7. A communication device according to claim 6, wherein said predetermined verification data exchanged between said cryptographic means and said IC card is encrypted by said second encryption algorithm.

8. A communication device according to claim 6, further comprising:

error determination means for determining an error in operation of said cryptographic means, said communication means, said drive means, said IC card, and said verification means, and for adding error data indicative of said determined error to said transmission data.

9. The communication device according to claim 1, further comprising:

error determination means for determining an error in operation of said cryptographic means and in said communication means, and for adding error data indicative of determined errors to said transmission data.

10. A vehicle monitoring system for monitoring a vehicle that cruises along a road, said system comprising:

a vehicle-mounted device mounted on said vehicle; and a roadside device for emitting signals towards a predetermined communication area, said roadside device being installed along said road and performing a communication operation with said vehicle-mounted device when said vehicle is within said communication area, wherein said vehicle-mounted device comprises:

drive means for receiving an IC card that stores predetermined card data;

communication means for performing said communication operation with said roadside device by transmitting transmission data generated based on said card data to said roadside device and by receiving reception data from said roadside device; and cryptographic means for encrypting, using a first encryption algorithm, said card data read through said drive means to generate said transmission data and for decrypting, using said first encryption algorithm, said reception data to obtain decrypted data, said cryptographic means being further for encrypting, using a second encryption algorithm different from said first encryption algorithm, a result of said communication operation of said communication means and storing said result of said communication operation encrypted using said second encryption algorithm in said IC card through said drive means.

11. A vehicle monitoring system according to claim 10, wherein said vehicle-mounted device and said roadside device perform communication operations using communication data that includes an encrypted part and an unencrypted part.

12. A vehicle monitoring system according to claim 11, wherein said communication operations are performed to carry out a toll charge process when the vehicle travels along a toll road, said communication data comprising identity data intrinsic to said vehicle-mounted device and said IC card, process data used for said toll charge process and incidental data other than said identity data and said process data, both said identity data and said process data being encrypted and forming said encrypted part, said incidental data being unencrypted and forming said unencrypted part.

13. A vehicle monitoring system for monitoring a vehicle that cruises along a road, said system comprising:

a vehicle-mounted device mounted on said vehicle; and a roadside device for emitting signals towards a predetermined communication area, said roadside device being installed along said road and periodically emitting a pilot signal towards said communication area, said roadside device terminating the emission of said pilot signal after said vehicle enters said communication area, performing a communication operation with said vehicle-mounted device by sending and receiving communication data to and from said vehicle-mounted device while said vehicle is within said communication area, transmitting a transmission completion signal to said vehicle-mounted device to indicate completion of said communication operation, and restarting the emission of the periodic emission of said pilot signal after completing said communication operation with said vehicle-mounted device, wherein said vehicle-mounted device provides a pilot response signal to said roadside device after receiving said pilot signal from said roadside device and subsequently starts said communication operation with said roadside device, said vehicle-mounted device receiving said transmission completion signal from said roadside device after completing said communication operation with said roadside device, said roadside device terminating said emission of said pilot signal after receiving said pilot response signal from said vehicle-mounted device and starting a periodic emission of said pilot signal immediately after sending said transmission completion signal.

14. A vehicle monitoring system according to claim 13, wherein:

said roadside device sends an unmodulated carrier wave for a predetermined time period to said vehicle-mounted device after sending one of said pilot signal and said communication data to said vehicle-mounted device;

said vehicle-mounted device generating said communication data by modulating said carrier wave signal based on predetermined transmission information and providing said communication data to said roadside device; and said vehicle-mounted device sending a completion request signal to said roadside device after completing said communication operation with said roadside device unless said roadside device sends said transmission completion.

15. A vehicle monitoring system according to claim 13, wherein:

said roadside device is installed in one of an entrance and an exit of said road, said roadside device decrypting said communication data indicative of toll payment information from said vehicle-mounted device during said communication operation with said vehicle-mounted device, said roadside device performing a toll charge operation to collect a toll charge from said vehicle-mounted device based on said toll payment information, and encrypting a result of said toll charge operation and sending said encrypted result to said vehicle-mounted device;

said vehicle-mounted device sends said encrypted data indicative of said toll payment information during said communication operation with said roadside device;

said vehicle-mounted device receives said encrypted result of said toll charge operation from said roadside device, and decrypts and stores said result; and said vehicle-mounted device and said roadside device transmit said communication data using a common format.

16. A device for installation in a vehicle for communicating with a roadside device installed in the vicinity of a road traveled by the vehicle, said communication device comprising:

an IC card reader for reading predetermined card data from an IC card, said IC card comprising storage media for storing said predetermined card data;

an encryptor for encrypting, using a first encryption algorithm, said predetermined card data;

a wireless transmitter transmitting to said roadside device transmission data generated based on said predetermined card data and comprising the encrypted predetermined card data;

a wireless receiver receiving from said roadside device reception data when said vehicle is within a predetermined communication range of said roadside device; and a decryptor for decrypting, using said first encryption algorithm, said reception data;

an encryptor for encrypting, using a second encryption algorithm, data resulting from said communication between said communication device and said roadside device, said second encryption algorithm being different from said first encryption algorithm; and a write mechanism for storing the encrypted data resulting from said communication in said IC card.

17. A communication device according to claim 16, wherein said first encryptor encrypts said predetermined card data faster than said second encryptor encrypts said data resulting from said communication.

18. A communication device according to claim 16, wherein said communication device is mounted on a vehicle.

* * * * *